(12) United States Patent  
Ueyama et al.

(10) Patent No.: US 7,930,803 B2  
(45) Date of Patent: Apr. 26, 2011

(54) FOLDABLE DEVICE

(75) Inventors: Tomoki Ueyama, Tottori (JP); Jiro Osaki, Tottori (JP)

(73) Assignees: Sanyo Electric Co., Ltd., Moriguchi-shi (JP); Tottori Sanyo Electric Co., Ltd., Tottori-shi (JP)

( * ) Notice: Subject to any disclaimer, the term of this patent is extended or adjusted under 35 U.S.C. 154(b) by 590 days.

(21) Appl. No.: 11/997,472

(22) PCT Filed: Jul. 31, 2006

(86) PCT No.: PCT/JP2006/315149  
§ 371 (c)(1),  
(2), (4) Date: Jan. 31, 2008

(87) PCT Pub. No.: WO2007/015461  
PCT Pub. Date: Feb. 8, 2007

(65) Prior Publication Data  
US 2010/0071155 A1    Mar. 25, 2010

(30) Foreign Application Priority Data

Aug. 2, 2005 (JP) ................................ 2005-224092  
Aug. 2, 2005 (JP) ................................ 2005-224093

(51) Int. Cl.  
*E05D 3/06* (2006.01)

(52) U.S. Cl. ................ 16/366; 16/354; 16/250; 16/330; 16/369

(58) Field of Classification Search .................. 16/354, 16/366, 250, 251, 303, 330, 337, 338, 340, 16/374; 49/382, 383; 160/229.1, 231.2, 160/232, 236; 455/575.1–575.4, 90.3, 90.1; 379/433.13, 433.12; 361/679.06, 679.12, 361/679.27

See application file for complete search history.

(56) References Cited

U.S. PATENT DOCUMENTS 2,206,739 A * 7/1940 Brogren et al. ................ 16/354

(Continued)

FOREIGN PATENT DOCUMENTS

CN        101124414 A      2/2008

(Continued)

OTHER PUBLICATIONS

International Search Report of PCT/JP2006/315149, date of mailing Oct. 10, 2006.

(Continued)

*Primary Examiner* — Chuck Y. Mah  
(74) *Attorney, Agent, or Firm* — Westerman, Hattori, Daniels & Adrian, LLP

(57) ABSTRACT

A folding apparatus (1) having transmitter and receiver cases (2, 10), a hinge mechanism (20) for pivotally connecting one end of the transmitter case and that of the receiver case to each other, and a hinge cover (C). The hinge mechanism is connected to corners (15a-16b) of the one end of the transmitter case and of that of the receiver case. The corners (15a-16b) are projected in the direction orthogonal to the one end of each of the transmitter and receiver cases, and the hinge mechanism is installed between the projected corners of the cases. The hinge cover has a pair of box-shaped cover members (7, 8), and a cross-section of each cover member taken in the direction orthogonal to the one end has an ellipse shape. The cover members are arranged so as to face to each other, covering and holding the hinge mechanism located between the projected corners of the transmitter and receiver cases. A fixing means for fixing the pair of the cover members to each other is provided at the one side of the pair of the cover members that are arranged faced to each other, and this one side is a side close to the one end of at least either the transmitter case or the receiver case. Design and mechanical strength of the connection section of a folding apparatus having the pair of apparatus cases are improved.

13 Claims, 16 Drawing Sheets

U.S. PATENT DOCUMENTS

| | | | |
|---|---|---|---|
| 4,765,027 A * | 8/1988 | Andric | 16/354 |
| 5,102,084 A * | 4/1992 | Park | 248/286.1 |
| 5,666,694 A | 9/1997 | Slow et al. | |
| 5,867,872 A * | 2/1999 | Katoh | 16/337 |
| 5,987,704 A | 11/1999 | Tang | |
| 6,108,868 A | 8/2000 | Lin | |
| 6,519,812 B2 * | 2/2003 | Ko et al. | 16/354 |
| 6,925,684 B2 * | 8/2005 | Kang et al. | 16/264 |
| 6,926,546 B2 | 8/2005 | Kurokawa | |
| 6,963,766 B2 | 11/2005 | Jung | |
| 7,251,512 B2 | 7/2007 | Kokiyama | |
| 7,272,423 B2 | 9/2007 | Satoh et al. | |
| 7,426,406 B2 | 9/2008 | Maatta et al. | |
| 7,483,723 B2 | 1/2009 | Soderlund | |
| 2004/0212956 A1 | 10/2004 | Kuivas et al. | |
| 2005/0155182 A1 | 7/2005 | Han et al. | |
| 2005/0239519 A1 | 10/2005 | Saitou et al. | |
| 2006/0236505 A1 | 10/2006 | Maatta et al. | |
| 2006/0238968 A1 * | 10/2006 | Maatta et al. | 361/683 |
| 2006/0238970 A1 * | 10/2006 | Ukonaho et al. | 361/683 |
| 2006/0279942 A1 * | 12/2006 | Yasuda | 361/796 |
| 2007/0226955 A1 * | 10/2007 | Cho et al. | 16/354 |
| 2008/0307608 A1 * | 12/2008 | Goto | 16/366 |
| 2009/0000062 A1 | 1/2009 | Yamanami | |
| 2009/0013500 A1 | 1/2009 | Ueyama et al. | |
| 2010/0071155 A1 | 3/2010 | Ueyama et al. | |

FOREIGN PATENT DOCUMENTS

| | | |
|---|---|---|
| EP | 1614913 A1 | 1/2006 |
| JP | 55-36551 A | 3/1980 |
| JP | 3-111241 U | 11/1991 |
| JP | 9-130058 A | 5/1997 |
| JP | 2001-234920 A | 8/2001 |
| JP | 2001-251396 A | 9/2001 |
| JP | 3083003 U | 10/2001 |
| JP | 2002-276643 A | 9/2002 |
| JP | 2004-84756 A | 3/2004 |
| JP | 2004-308710 A | 11/2004 |
| JP | 2004-316382 A | 11/2004 |
| JP | 2004-047968 A | 12/2004 |
| JP | 2005-6091 A | 1/2005 |
| JP | 2005-019629 A | 1/2005 |
| JP | 2005-76666 A | 3/2005 |
| JP | 2005-155750 A | 6/2005 |
| JP | 2006-234160 A | 9/2006 |
| WO | 2004/090355 A1 | 10/2004 |
| WO | 2006-080308 A1 | 8/2006 |
| WO | 2006/080308 A1 | 8/2006 |
| WO | 2007-086281 A1 | 8/2007 |

OTHER PUBLICATIONS

Notification of Transmittal of Translation of the International Preliminary Report on Patentability (Form PCT/IB/338) of International Application No. PCT/JP2006/315149 mailed Feb. 14, 2008 with Forms PCT/IB/373 and PCT/ISA/237(English translation).

International Search Report of PCT/JP2006/315044, date of mailing Oct. 10, 2006.

U.S. Office Action in U.S. Appl. No. 11/997,083 dated Jul. 9, 2010.

* cited by examiner

FIG.12A
FIG.12B
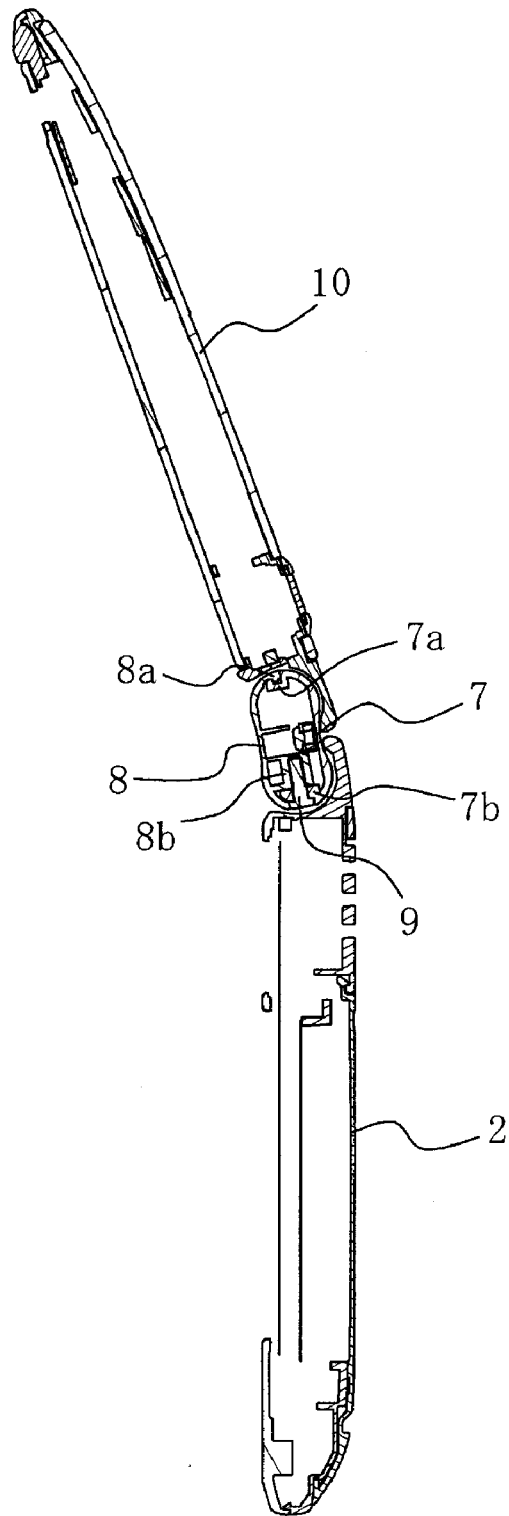
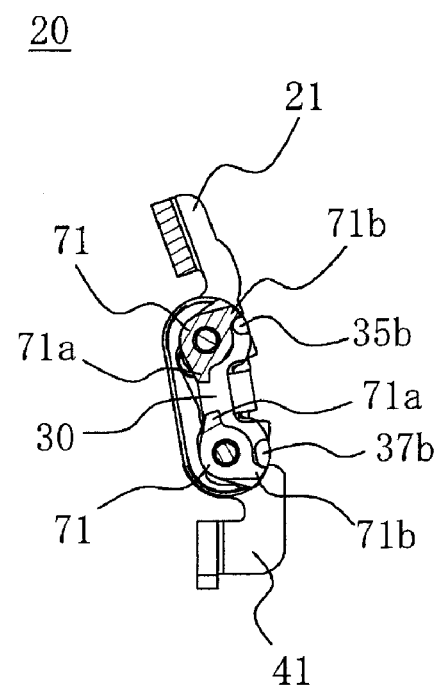

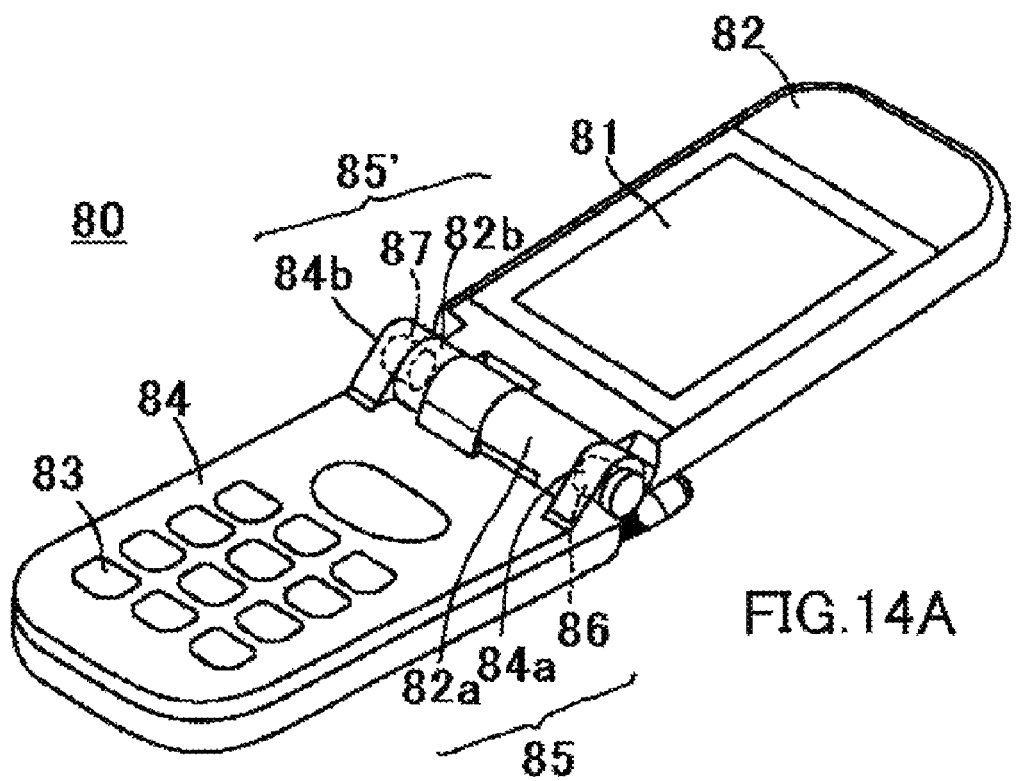
RELATED ART FIG.14A
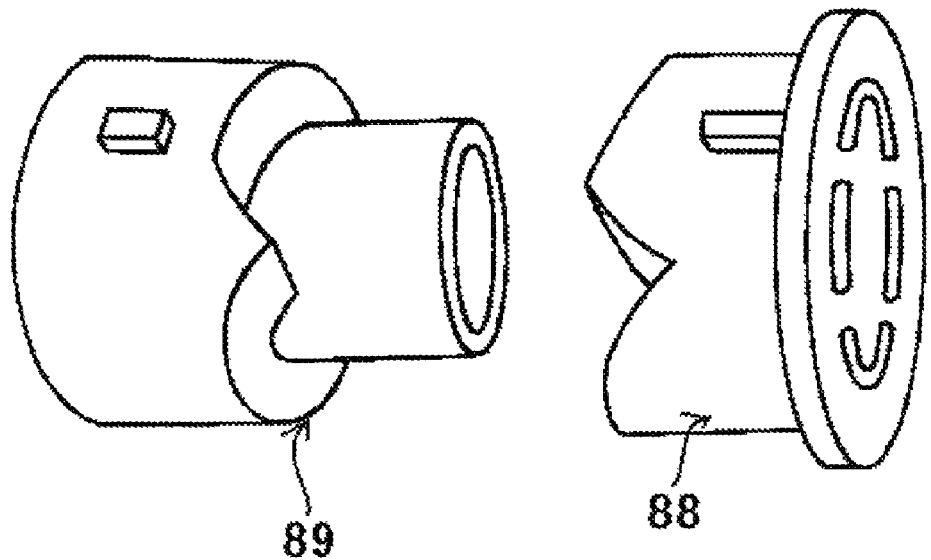
RELATED ART FIG.14B

RELATED ART

FOLDABLE DEVICE

TECHNICAL FIELD

The present invention relates to a foldable device, and particularly relates to a foldable device having enhanced design, and a structure of a hinge cover for covering a hinge mechanism for linking a pair of device cases together in a mobile telephone, a notebook personal computer, an electronic dictionary, or the like.

BACKGROUND ART

The use of mobile telephones, notebook personal computers, electronic dictionaries, and other electronic information devices has recently become widespread. In terms of software, various types of software have been developed and installed in these electronic information devices to increase performance, and in terms of hardware, progress has been made in reduced size, reduced weight, and design implementation. Hardware size reduction, weight reduction, and design implementation have been developed the most in mobile telephones in particular, and various types of mobile telephones have been proposed (see Patent References 1 and 2 below, for example).

FIG. 14 shows the folding mobile telephone described in Patent Reference 1, wherein FIG. 14A is a perspective view, and FIG. 14B is a partially enlarged perspective view showing the hinge mechanism.

The folding mobile telephone 80 is composed of a cover body case 82 provided with a display part 81, a speaker, or the like; a main body case 84 provided with a wireless transceiver circuit and various types of operating keys 83, a microphone, or the like; and hinge mechanisms 85, 85'; and has a structure in which the cover body case 82 and the main body case 84 are connected to each other by the hinge mechanisms 85, 85' so as to be able to fold together.

The hinge mechanisms 85, 85' are composed of the hinge mechanism 85 shown in the right side of FIG. 14A, and the hinge mechanism 85' shown on the left side of FIG. 14A. Among these hinge mechanisms, a first bridge part 84a that protrudes from the right-side hinge mechanism 85, and a first bridge part 82a that protrudes from the cover body case 82 are disposed on the same axis in the main body case 84, and a hinge assembly 86 is fitted into the center holes of the first bridge parts 84a, 82a. In the left-side hinge mechanism 85', a second bridge part 84b that protrudes from the main body case 84, and a second bridge part 82b that protrudes from the cover case 82 are disposed on the same axis, and a hinge shaft 87 is fitted into the center holes of the bridge parts 84b, 82b. As shown in FIG. 14B, the hinge assembly 86 fitted into the center holes of the first bridge parts 84a, 82a is composed of a main body drive unit 88 that rotates integrally with the main body case, and is connected to an end part of the main body case 84; a cover body drive unit 89 that rotates integrally with the cover body case, and is connected to an end part of the cover body case 82; a motive mechanism (not shown) disposed between the main body drive unit 88 and the cover body drive unit 89, for exerting a force for rotating the cover body drive unit 89 in the opening direction of the cover body case 82; and a maintaining mechanism for maintaining the cover body case 82 in the closed position when the cover body case 82 is in the closed state.

Through the use of such a hinge mechanism, the cover body case 82 can be smoothly opened and closed in folding fashion with respect to the main body case 84 in the folding mobile telephone of Patent Reference 1.

FIGS. 15 and 16 show the folding mobile telephone described in Patent Reference 2, wherein FIG. 15 is an exploded perspective view showing the mobile telephone, FIG. 16A is a side view showing a state in which the mobile telephone case is folded together, FIG. 16B is an enlarged sectional view showing the portion to which the hinge mechanism of the mobile telephone is provided, and FIG. 16C is a partial enlarged sectional view along line X-X in FIG. 16B.

The folding mobile telephone 90 is provided with a transmitter case 91 composed of a pair of housings 91A, 91B; a connecting member 92 connected so as to be capable of rotating about a first rotational axis L1 to a housing part 91C that is formed at one end part of the transmitter case 91; a receiver case 94 composed of a pair of housings 94A, 94B and connected to a housing part 94C formed at one end thereof, so as to be capable of rotating about a second rotational axis L2 that is parallel to the first rotational axis L1 of the connecting member 92; wherein the transmitter case 91 and the receiver case 94 are connected to each other by the connecting member 92, and can rotate at the same angle as each other in opposite directions.

The transmitter and receiver cases 91, 94 are in thin rectangular shapes, accommodating concave parts are formed at both end parts in the longitudinal direction of the housing parts 91C, 94C, pairs of housing concave parts are provided on the extension lines of the first rotational axis L1 and the second rotational axis L2 at both end parts in the longitudinal direction of the connecting member 92, and a pair of first hinges 95A, 95A and a pair of second hinges 95B, 95B are accommodated in the accommodating concave parts. The first hinges 95A, 95A are disposed in the housing concave parts of the connecting member 92 and the transmitter case 91, and the second hinges 95B, 95B are disposed in the housing concave parts of the connecting member 92 and the receiver case 94, whereby the connecting member 92 and the transmitter case 91 are connected so as to be capable of rotating, and the connecting member 92 and the receiver case 94 are connected so as to be capable of rotating.

The connecting member 92 rotates from the folded position to the final opened position with respect to the transmitter case 91. At this time, in the folded position, the connecting member is restricted by coming in contact with a first contacting surface 97 composed of a wall surface that extends in the minor axis direction of the transmitter case 91 among the wall surfaces that partition the housing part 91C. In the opened position, the connecting member 92 is restricted by coming in contact with a second contacting surface 98 formed on the end positioned on the external edge part in the minor axis direction of the housing part 91C.

According to this configuration, since a fixed rotational sequence is always maintained for the rotation of the connecting member with respect to one case of the transmitter and receiver cases, and for the rotation of the other case with respect to the connecting member, folding and opening can be performed smoothly without imparting discomfort to the user.

Patent Reference 1: Japanese Laid-open Patent Application No. 2001-251396 (FIGS. 2 and 5, paragraphs 0016 through 0021)

Patent Reference 2: Japanese Laid-open Patent Application No. 2004-308710 (FIGS. 2 through 5, paragraphs 0010 through 0015)

DISCLOSURE OF THE INVENTION

Problems the Invention is Intended to Solve

In the folding mobile telephone described in Patent References 1 and 2, since the cover body case (receiver case) and the main body case (transmitter case) are connected by a hinge mechanism that allows both cases to fold together, folding and opening of the cover body case and the main body case can be performed smoothly.

However, in the folding mobile telephone disclosed in Patent Reference 1, the hinge assembly having a drive member is accommodated inside the first bridge part, and the size of the outline of the first bridge part therefore increases, and the outline of the other second bridge part also increases in size in conjunction with the outline of the first bridge part. A cylindrical protrusion is therefore formed by the connecting part of this mobile telephone in the open state. When such a protrusion is present in the connecting part, the user is made conscious of the presence of this protrusion and is given an image of a conspicuous machine part having inferior design, and the usable surface area of the cover body case and the main body case is also reduced by the presence of the protrusion. Since operating keys in the main body case are disposed near the connecting parts, i.e., the cylindrical protrusion, the operating area of the operating keys is reduced by the presence of such a protrusion, and the number of provided operating keys is limited. Operation can also be hindered by the fingertips striking the protrusion during operation.

Since two rotation shafts are provided in the mobile telephone disclosed in Patent Reference 2, no protrusion is formed in the connecting part of the transmitter and receiver cases, and the surface in the open state is therefore flat. The transmitter and receiver cases and the connecting member are also connected by pairs of first and second hinges on the first and second rotation shafts L1, L2, respectively, but the hinge members are each rotated independently of each other.

However, in the mobile telephone of Patent Reference 2, since the connecting member 92 is formed from a resin or metal molded article, and the transmitter and receiver cases 91, 94 are generally formed from a resin material, the connecting member 92 is preferably formed from the same resin material for the sake of design. However, when the connecting member 92 is formed from a resin material, drawbacks occur in that the mechanical strength is low, and the connecting member can break through repeated opening and closing of the mobile telephone. On the other hand, when the connecting member 92 is formed from a metal material, the mechanical strength is enhanced, but the design is adversely affected by the difference in material with respect to the transmitter and receiver cases 91, 94.

Furthermore, the transmitter and receiver cases and the connecting member are connected to each other by pairs of first and second hinges on first and second rotation shafts L1, L2, respectively, and the hinges are each rotated independently of each other. Therefore, when the folding mobile telephone is opened to an intermediate position from the folded state, i.e., when the receiver case 94 is rotated to the upright position with respect to the transmitter case 91, for example, the connecting member 92 is not rotated with respect to the transmitter case 91, and rotation occurs together with the receiver case 94 when the receiver case 94 is rotated from the upright position to the open position. Specifically, since rotation based on the two rotation shafts is switched from the folded state to the open state, rotation is generally stopped in the intermediate position in which the rotation shafts are switched, and the rotation operation cannot be smoothly performed. Furthermore, since the rotation timing of each hinge is controlled by adjusting the rotational urging force of each hinge, the rotation timing of each hinge can fluctuate over the course of multiple openings and closings, and stable opening and closing becomes impossible when such fluctuation occurs.

Furthermore, in the folding mobile telephones described in Patent References 1 and 2, since the transmitter and receiver cases and the member constituting the hinge mechanism are adjacent to each other, the hinge member and the transmitter and receiver cases rub against each other during opening and closing of the transmitter and receiver cases, and this rubbing can create a sound, e.g., a creaking sound, that is unpleasant to the user. Such a sound can be eliminated by loosening the connections between the hinge mechanism and the transmitter and receiver cases, but play then develops between the cases and the hinge mechanism, and folding of the transmitter and receiver cases becomes unstable.

In view of the foregoing drawbacks, and as a result of various investigations of a connecting structure in which design properties and mechanical strength are obtained at the same time, the inventors developed the present invention upon discovering that the drawbacks described above can be overcome by using a metal hinge mechanism, covering the hinge mechanism with a cover, and devising a fixing means for the cover.

Another contributing factor to the development of the present invention was the discovery that a stable and smooth rotation can be performed, the hinge mechanism does not obstruct operation of the keys, and a foldable device having improved design can be provided by imparting a thickness to the hinge mechanism at which the hinge mechanism does not protrude from the mobile telephone surface in the open state, and ensuring that the pair of device cases always rotate symmetrically with respect to the hinge mechanism.

Specifically, an object of the present invention is to provide a foldable device in which the design, operability, and mechanical strength are enhanced in the connecting part of a foldable device provided with a pair of device cases.

Another object of the present invention is to provide a foldable device in which opening and closing are performed stably and smoothly without a creaking sound or the like occurring in the connecting part during opening and closing of the pair of device cases.

Means for Solving the Abovementioned Problems

In order to achieve the abovementioned objects, the foldable device according to the present invention is a foldable device comprising a pair of device cases, a hinge mechanism for pivotally connecting an end part on one side of each of the pair of device cases with each other, and a hinge cover for covering the hinge mechanism, wherein the foldable device is characterized in that both corners of an end part on one side of the pair of device cases to which the hinge mechanism is connected protrudes a prescribed length in a direction orthogonal to the end part on one side, and the hinge mechanism is attached between the protruding corners of the pair of device cases; the hinge cover is composed of a pair of box-shaped cover members having a cross-section that is substantially half-oval shaped in a direction orthogonal to the end part on one side; the cover members constituting the pair are disposed facing each other so as to sandwich and thereby cover the hinge mechanism positioned between the protruding corners of the pair of device cases; and fixing means is provided for fixing the pair of cover members with respect to each other in an area adjacent to the end part on one side of at least one of the pair of device cases when the cover members are disposed facing each other.

The abovementioned foldable device is also characterized in that the fixing means comprises a locking screw fastening opening having a screw hole, and the pair of cover members is fixed by screwing of a locking screw so as to communicate the screw hole of the locking screw fastening opening of the pair of cover members.

The abovementioned foldable device is also characterized in that the fixing means is provided to an area adjacent to the end part on one side of one of the pair of device cases, and a hook-shaped locking part is provided to an area adjacent to the end part on one side of another of the pair of device cases.

The abovementioned foldable device is also characterized in that a length of a portion positioned between the corners of the pair of cover members is a prescribed length shorter than a length between the corners of the pair of device cases.

The abovementioned foldable device is also characterized in that the hinge mechanism has a first rotation shaft provided between the corners of one of the device cases, and a second rotation shaft provided between the corners of another of the device cases; and a set of two notches that surround first and second rotation shafts of the hinge mechanism is provided to each area adjacent to an area in which the fixing means of the pair of cover members are provided.

The abovementioned foldable device is also characterized in that the pair of device cases comprises plate-shaped bodies having a prescribed thickness, and a control board or the like inside the device cases; the hinge mechanism has first and second rotation shafts; the first and second rotation shafts are disposed parallel and adjacent to a side wall of an end part on one side of the pair of device cases that is connected by the hinge mechanism; the rotation shafts are linked together so that a rotation angle of the first rotation shaft and the second rotation shaft is always rotated at the same angle in an opposite direction; and the hinge cover has substantially the same thickness or slightly less thickness than the pair of device cases in a state of covering the hinge mechanism.

The abovementioned foldable device is also characterized in that the hinge mechanism is composed of a metal rigid body.

The abovementioned foldable device is also characterized in that the pair of device cases and the hinge cover are formed from a resin material.

The abovementioned foldable device is also characterized in that the hinge mechanism comprises a first frame provided with a joining piece composed of a plate-shaped body having a prescribed length that is attached to one of the device cases, and first and second arm pieces that stand in the same direction from both end parts of the joining piece, and in which joining parts are formed at distal end parts of the first and second arm pieces; a second frame provided with a joining piece composed of a plate-shaped body having a prescribed length that is attached to another of the device cases, and third and fourth arm pieces that stand in the same direction from both end parts of the joining piece, and in which joining parts are formed at distal end parts of the third and fourth arm pieces; and a third frame provided with a joining piece composed of a plate-shaped body having a prescribed length, and first and second connecting pieces that stand in one direction from both end parts of the joining piece, and are branched to the left and right, and that have first through fourth joining parts connected to the first through fourth arm pieces at the branched distal end parts; wherein the joining parts formed in the first through fourth arm pieces, and the first through fourth joining parts are connected so as to be able to rotate; first through fourth connecting parts are formed, and a drive mechanism for rotating/retaining the first and second frames in a prescribed position is provided to at least one of the first through fourth connecting parts; and a connection is formed by a linking mechanism between at least one combination of connecting parts of the first or second connecting part and the third or fourth connecting part, and when the first frame is rotated a prescribed angle in one direction in relation to the third frame about the first and second connecting parts as an axis, the linking mechanism links the rotation so that the second frame rotates the same angle as the first frame in the opposite direction with respect to the third frame about the third and fourth connecting parts as an axis.

The abovementioned foldable device is also characterized in that fixing means for fixing at least one of the pair of cover members is provided to a joining piece of the third frame.

The abovementioned foldable device is also characterized in that the drive mechanism is a cam mechanism composed of a pair of cam ends and a spring body for pushing the cam ends, wherein the linking mechanism is a gear mechanism composed of gears fixed to each of the first or second arm piece and the third or fourth arm piece, and an even number of free gears attached between the gears.

The abovementioned foldable device is also characterized in that the drive mechanism is a cam mechanism composed of a pair of cam ends and a spring body for pushing the cam ends, wherein the linking mechanism is a link mechanism composed of an actuation bar in which a center part of the actuation bar is fixed so as to be able to rotate between the first or second connecting part and the third or fourth connecting part, and a pair of cam bridge ends fixed to a rotation shaft of the first or second arm piece and the third or fourth arm piece that fix one end part and the other end part of the actuation bar in a position separated a prescribed distance from the rotation shaft.

Effect of the Invention

Such excellent effects as those described below are obtained through the configuration of the present invention described above. Specifically, according to the foldable device of the present invention, since the hinge mechanism is covered by a hinge cover composed of a pair of cover members, and a fixing means for the pair of hinge covers is provided in an area adjacent to the end part on one side of at least one of the pair of device cases, the fixing means cannot be seen from the outside even when the device cases are opened and closed. Since the hinge mechanism has a structure in which the hinge mechanism is covered by such a hinge cover, there is no need for the hinge cover to have mechanical strength. Therefore, since the same resin material or the like can be used to form the pair of device cases, for example, the design of the foldable device can be enhanced.

According to a preferred embodiment of the foldable device, stronger fixing is possible through the use of a screw as the fixing means, but since the screw is disposed in a position in which the screw is invisible from the outside, there is no risk of compromising the design.

According to a preferred embodiment of the foldable device, the fixing means is provided to an area adjacent to the end part on one side of one of the device cases, and a hook-shaped locking part is provided to an area adjacent to the other device case, whereby the area to which the locking part is provided is also essentially fixed through the fixing of a single fixing means, and the cover members can therefore be fixed together more strongly.

According to a preferred embodiment of the foldable device, the portion of the cover members positioned between both corners is formed so as to have a slightly shorter length than the space between both corners, whereby a prescribed gap is formed between both corners in the state in which the pair of cover members is attached, and the hinge cover and both corners of the device cases can thereby be prevented from rubbing together and creating a creaking sound or the like during opening and closing.

According to a preferred embodiment of the foldable device, a notch is provided so as to surround the rotating shaft in the area adjacent to the area in which the fixing means is provided, whereby dust and the like are prevented from easily penetrating into the hinge mechanism, and the hinge mechanism can be protected.

According to a preferred embodiment of the foldable device, the hinge mechanism is provided with two rotation shafts, and the two rotation shafts are linked so as to rotate at the same angle in opposite directions. The hinge cover has the same thickness or a slightly smaller thickness than the pair of device cases, whereby the pair of device cases and the hinge cover form a continuous surface that curves in steps, and a smooth curve as viewed from the side is therefore created, and the design is enhanced. When the foldable device is in the opened state, the hinge cover does not protrude from the surface or impede operation of the keys. Through this configuration, the keys have high operability, and the operating keys can be disposed in the vicinity of the hinge mechanism part. The entire device case can therefore be effectively utilized. Furthermore, since both rotation shafts always rotate to the same angle at the same time, there is no switching of the rotation shafts, and the rotation operation is stable and smooth.

According to a preferred embodiment of the foldable device, the hinge mechanism is composed of a metal rigid body, whereby the mechanical strength of the connecting parts of the pair of device cases can be increased.

According to a preferred embodiment of the foldable device, the pair of device cases and the hinge cover are formed from the same resin material, for example, whereby uniformity can be provided to the foldable device as a whole. The design can therefore be enhanced.

According to a preferred embodiment of the foldable device, the rotation shafts of the hinge mechanism have a structure composed of two shafts and first through third frames, whereby the second frame rotates in the same manner in the opposite direction based on the third frame in conjunction with the rotation of the first frame in one direction based on the third frame, for example, and the device cases therefore rotate smoothly. The rotation of the first frame and the rotation of the second frame are coupled. Therefore, although misalignment in the positioning of the device cases occurred in the conventional technique when the two shafts were independent in the folded state of the foldable device, such misalignment does not occur in the present invention. Specifically, when the hinge mechanism is applied to a folding mobile telephone, for example, there is no misalignment of the upper and lower housings of the mobile telephone, and a sense of instability is not imparted to the user.

According to a preferred embodiment of the foldable device, a cover member is fixed to the joining piece of the third frame, whereby the hinge cover is stably fixed with respect to the hinge mechanism, and the gaps between both corners of the device cases can be stably maintained.

According to a preferred embodiment of the foldable device, the drive mechanism is composed of a cam mechanism, and the linking mechanism is a gear mechanism or a link mechanism, whereby a suitable snap action is obtained in the foldable device, a rotational urging force or the like is not used in the coordination of the pair of device cases. A linking mechanism can therefore be provided that can withstand multiple uses, and whereby a stable and smooth rotating action can be obtained.

BRIEF DESCRIPTION OF THE DRAWINGS

FIGS. 9A and 9B show the hinge cover for covering the hinge mechanism, wherein FIG. 9A is an exploded perspective view, and FIG. 9B is an assembled perspective view;

FIGS. 10A and 10B show the relationship between the hinge mechanism and the folded state of the transmitter and receiver cases, wherein FIG. 10A is a side sectional view showing a state in which both cases are folded in a state in which the transmitter and receiver cases of FIG. 1 are cut along line A-A, and FIG. 10B is an enlarged side sectional view showing the hinge mechanism in the state shown in FIG. 10A;

FIGS. 11A and 11B show a state in which the transmitter and receiver cases of FIG. 10 are opened to 80°, wherein FIG. 11A is a side sectional view, and FIG. 11B is an enlarged side sectional view showing the hinge mechanism in the state shown in FIG. 11A;

FIGS. 12A and 12B show a state in which the transmitter and receiver cases of FIG. 10 are opened to 160°, wherein FIG. 12A is a side sectional view, and FIG. 12B is an enlarged side sectional view showing the hinge mechanism in the state shown in FIG. 12A;

FIGS. 14A and 14B show the conventional folding mobile telephone, wherein FIG. 14A is a perspective view, and FIG. 14B is a partial enlarged perspective view showing the hinge mechanism;

FIGS. 16A, 16B and 16C show the assembled state of the mobile telephone of FIG. 15, wherein FIG. 16A is a side view showing a state in which the mobile telephone cases are folded, FIG. 16B is an enlarged sectional view showing the portion of the mobile telephone to which the hinge mechanism is provided, and FIG. 16C is a partial enlarged sectional view along line X-X of FIG. 16B.

Figure 1:
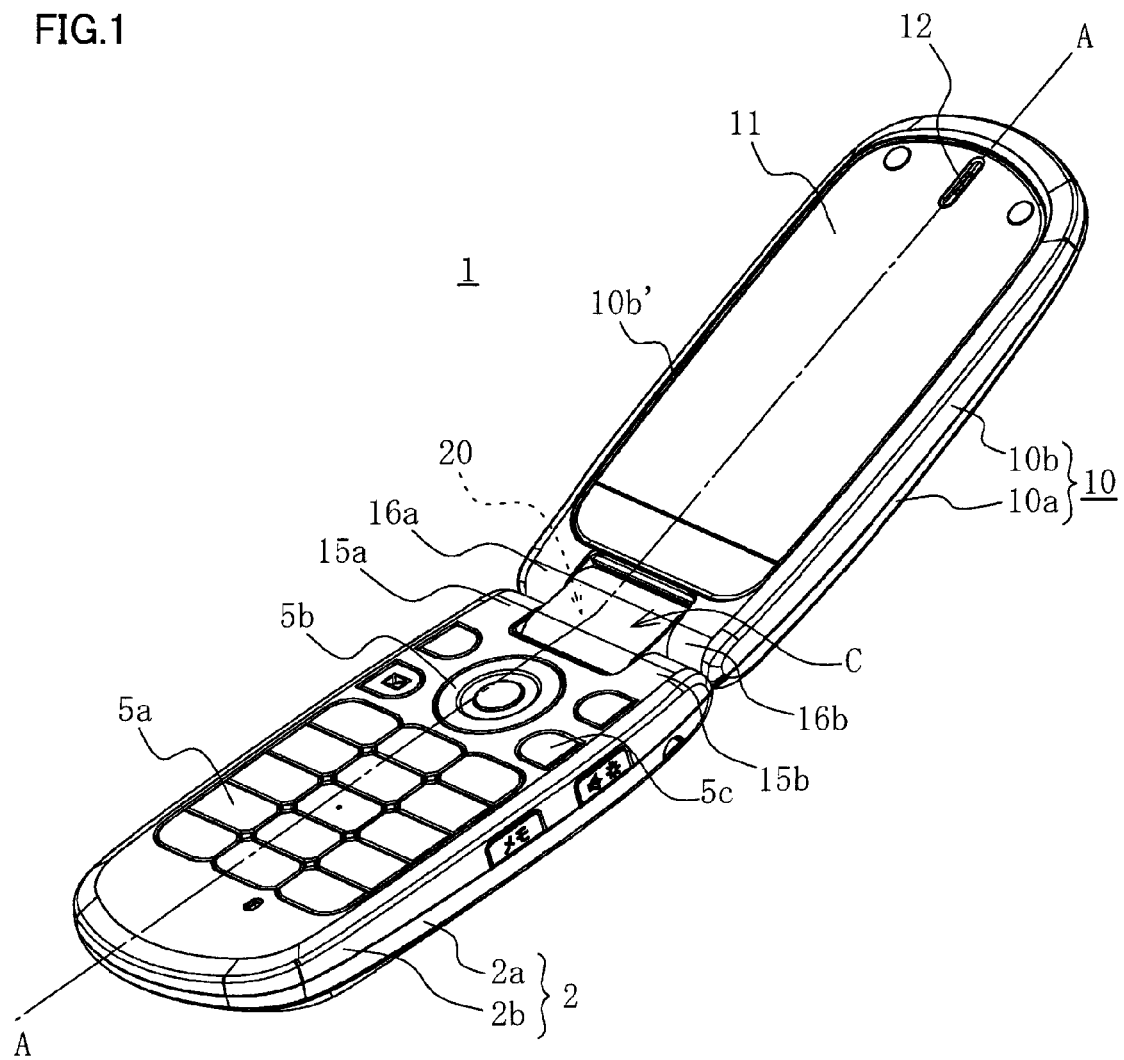
FIG. 1 is a perspective view showing the folding mobile telephone according to an example of the present invention.

KEY TO SYMBOLS 1 mobile telephone (foldable device)
2 transmitter case
6 FPC (lead line)
C hinge cover 7, 8 cover members
7a, 8a locking parts
7b, 8b locking screw fastening holes
7c, 8c notches
9 locking screw
9a, 9b passage holes
9c screw
10 receiver case
20 hinge mechanism
21 first frame
22 first arm piece
24 second arm piece
26 joining piece
26a, 26b attachment hole
30 connecting member (third frame)
31 joining piece
32 first connecting piece
33 second connecting piece
34 first joining part
34b cam
35 second joining part
35b locking protrusion
36 third joining part
36b cam
37 fourth joining part
37b locking protrusion
41 second frame
42 third arm piece
44 fourth arm piece
46 joining piece
46a, 46b U-shaped groove
50 drive mechanism
51 cylindrical cap
54 spring body pushing part
55 cam plate
55b cam
60 link mechanism
31 actuation bar
63 restricting plate
65 cam bridge piece
65a protruding rod
67 actuation stick
70 stopper mechanism
71 stopper member
71a, 71b locking tabs
101 first connecting part
102 second connecting part
103 third connecting part
104 fourth connecting part

BEST MODE FOR CARRYING OUT THE INVENTION

Preferred embodiments of the present invention will be described hereinafter with reference to the drawings. However, the embodiments described below are merely examples of the foldable device given as specific examples of the technical concept of the present invention, and are not intended to limit the present invention to this foldable device. The present invention can also be applied in equivalent fashion to embodiments other than those included in the claims. In the example described hereinafter, the present invention is applied to a folding mobile telephone as the foldable device, but the present invention is not limited to such a mobile telephone, and may also be applied to notebook PCs, electronic dictionaries, and various other types of devices that are provided with a folding mechanism.

Example 1

Figure 2:
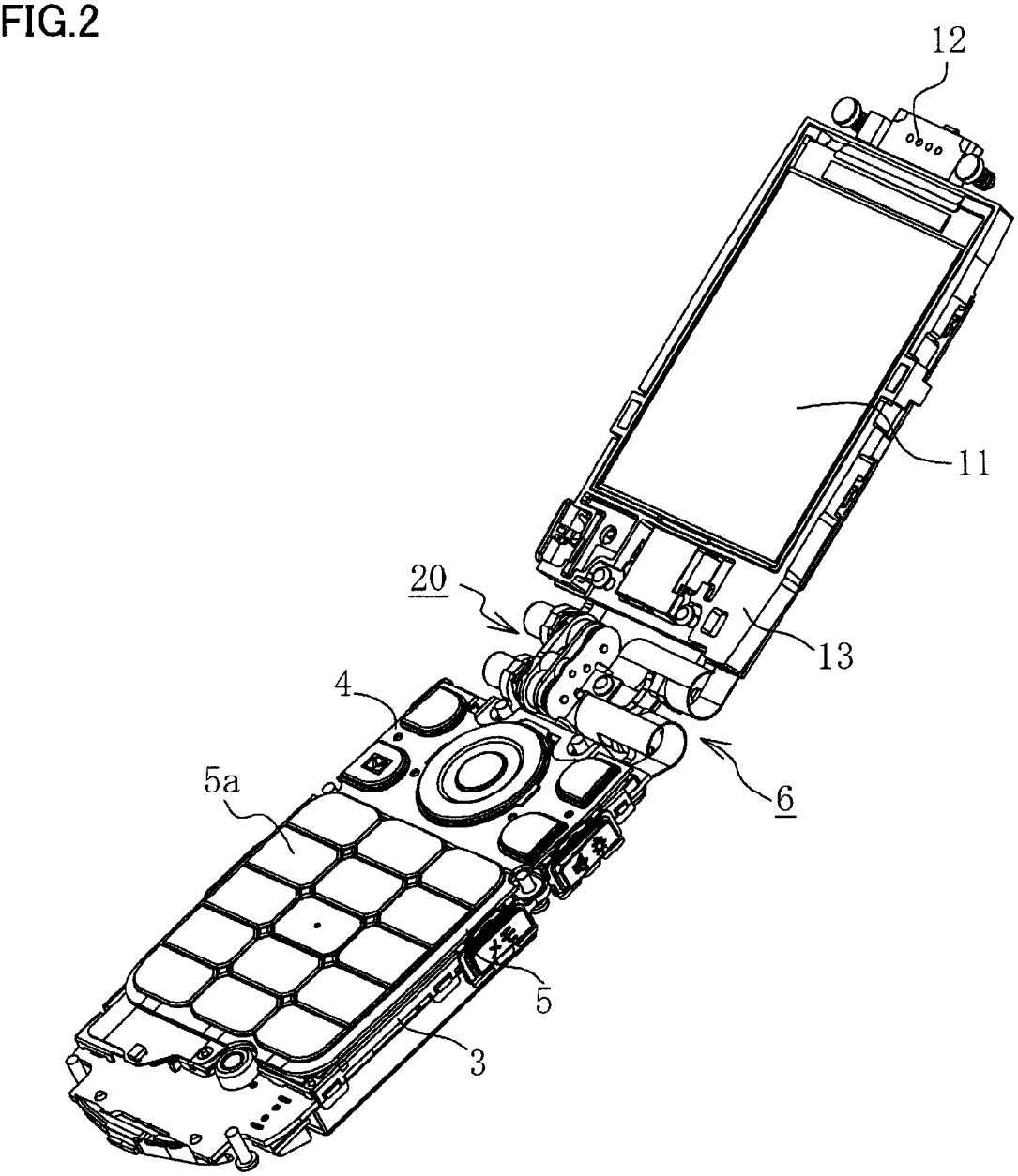
FIG. 2 is a perspective view showing a state in which the housing and case are removed from the mobile telephone of FIG. 1 so that the link mechanism and other internal mechanisms are visible.
Figure 3:
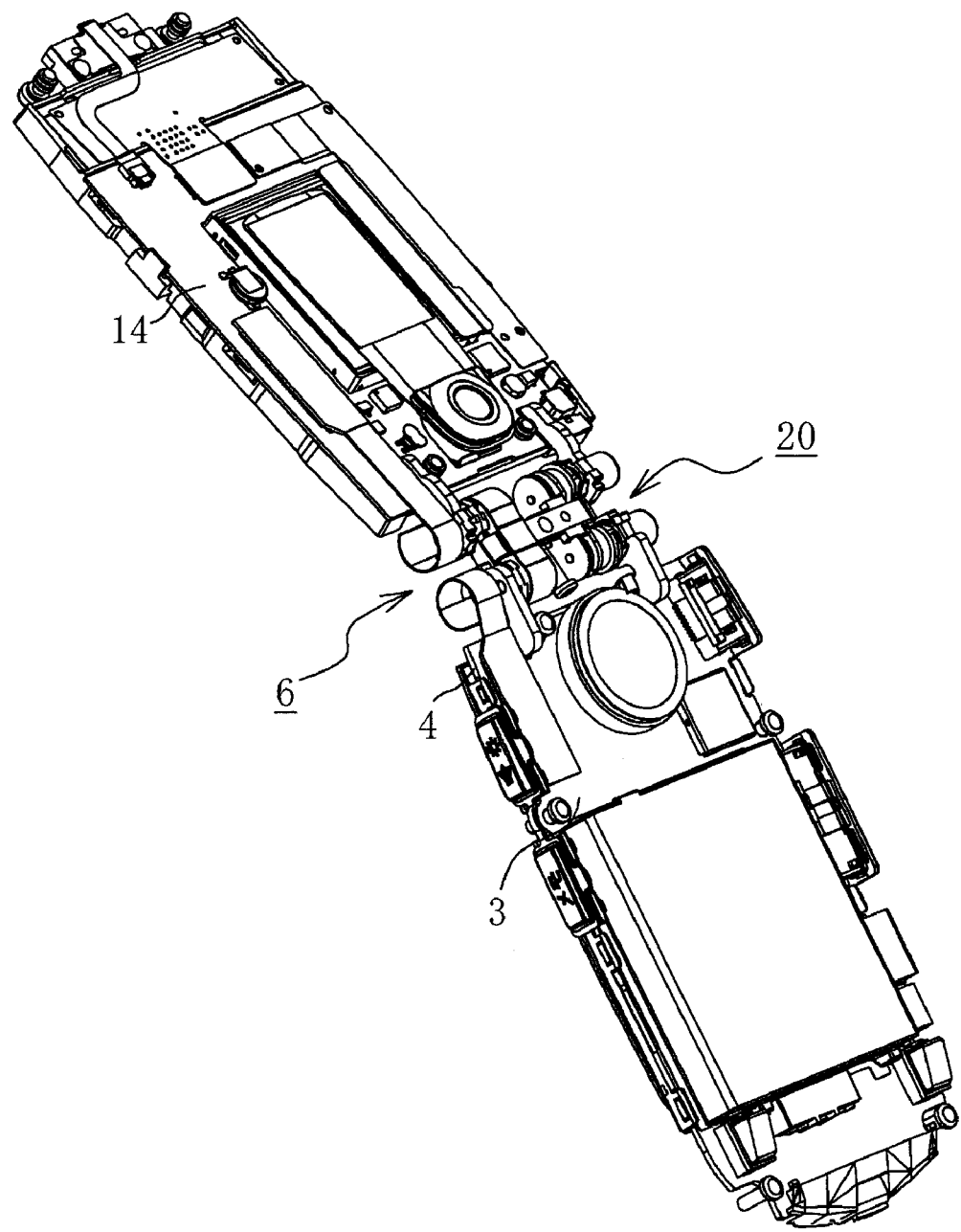
FIG. 3 is a perspective view from the back surface in FIG. 2.
Figure 4:
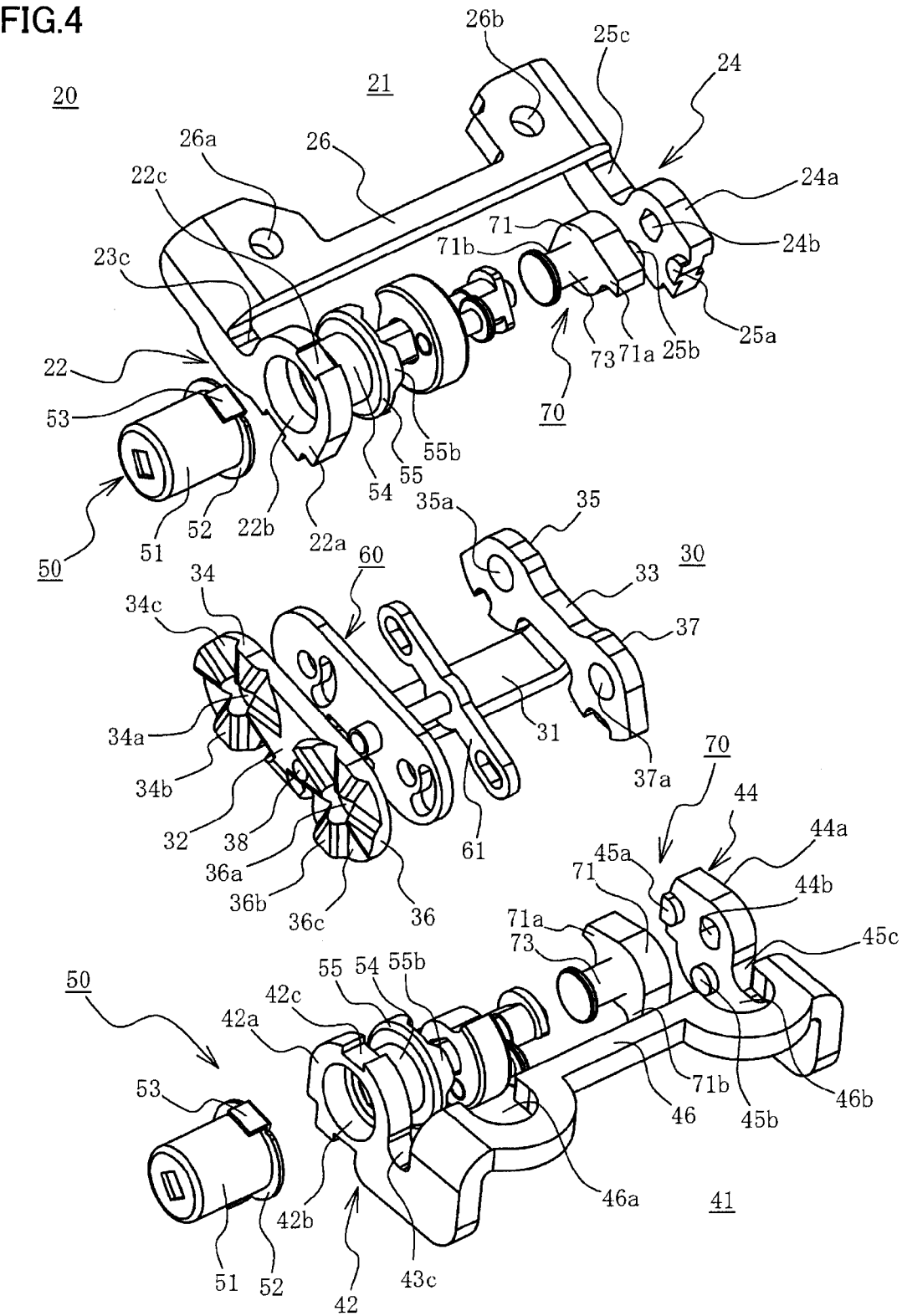
FIG. 4 is an exploded perspective view showing the components of the hinge mechanism.
Figure 5:
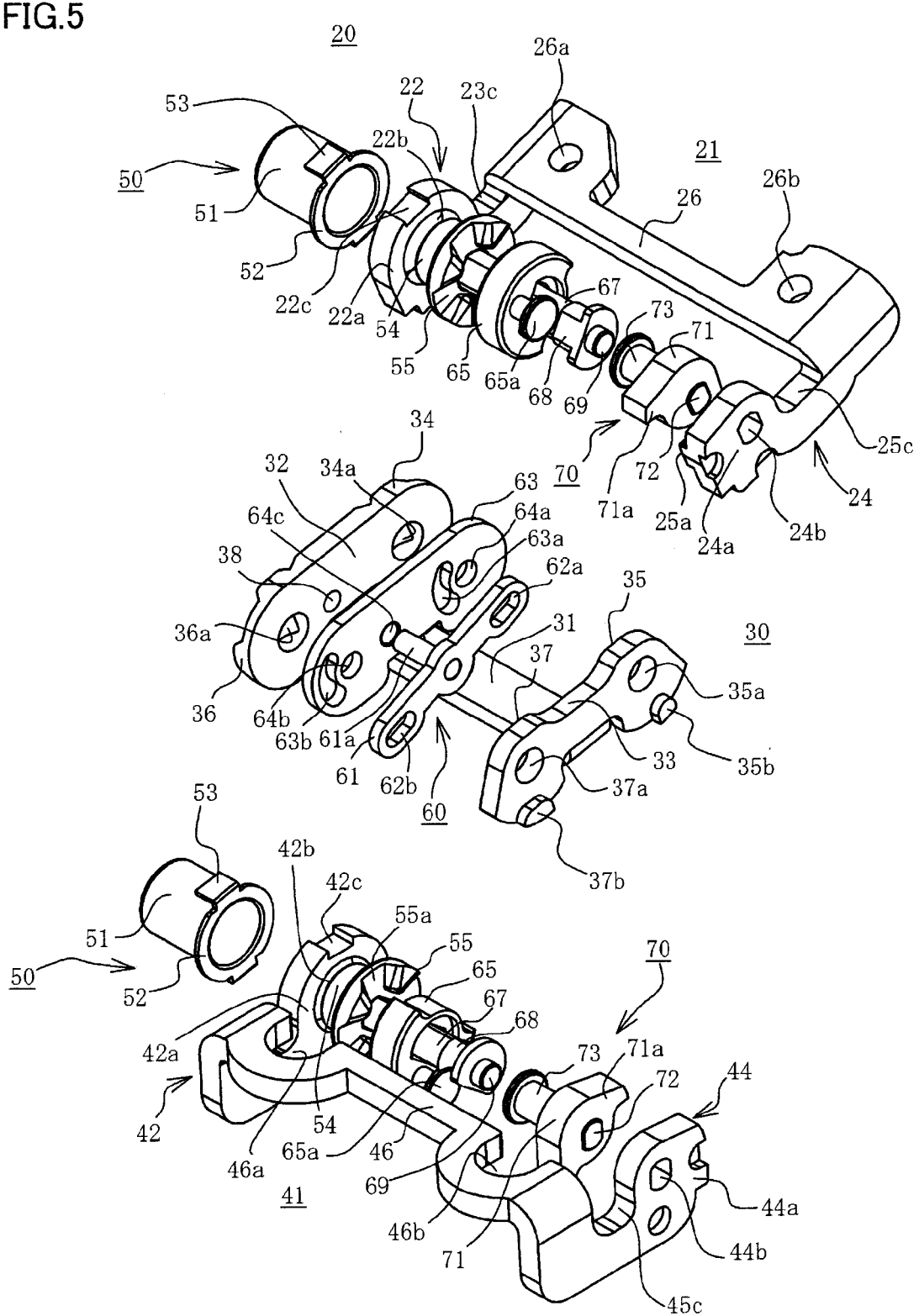
FIG. 5 is an exploded perspective view from a different direction than FIG. 4.

FIG. 1 is a perspective view showing the folding mobile telephone according to an example of the present invention; FIG. 2 is a perspective view showing a state in which the housing and case are removed from the mobile telephone of FIG. 1 so that the link mechanism and other internal mechanisms are visible; FIG. 3 is a perspective view from the back surface in FIG. 2; FIG. 4 is an exploded perspective view showing the components of the hinge mechanism; and FIG. 5 is an exploded perspective view from a different direction than FIG. 4.

As shown in FIGS. 1 through 3, the folding mobile telephone 1 is composed of a transmitter case 2 that accommodates a wireless transceiver circuit, various types of operating keys, a microphone, and other components; a receiver case 10 that accommodates a display unit, a receiver, or the like; and a hinge mechanism 20 for pivotally connecting the transmitter and receiver cases 2, 10. In FIG. 1, the hinge mechanism 20 is covered by a hinge cover C composed of a pair of cover members 7, 8. The hinge cover C and the transmitter and receiver cases 2, 10 are preferably formed from the same resin material so that uniformity can be provided to the folding mobile telephone 1 as a whole.

The transmitter case 2 has a narrow long box-shaped back surface housing 2a in which a control circuit board 3 and other components are housed inside and in which a speaker opening, a battery attachment part, and the like are formed in the bottom part; a control circuit board 3 provided with a microphone, a speaker, and the like housed in the back surface housing 2a; various types of operating keys 5a through 5c; and a surface housing 2b that covers the open part of the back surface housing 2a and has a plurality of holes through which the various types of operating keys 5a through 5c are exposed. The control circuit board 3, a switchboard for the various types of operating keys, and other components are housed in the back surface housing 2a, and the open part is covered by the surface housing 2b.

A communication control circuit for controlling the communication function, a network control circuit for controlling network connections and the like, and control circuits for controlling other functions are mounted in the control circuit board 3, and the control circuits are controlled by an internally housed CPU. These control circuits are publicly known, and therefore will not be described in detail. The switchboard, an operating sheet member, the control circuit board, and the like are fixed to a support frame 4, and an end part on one side of the support frame 4 is fixed to the second frame 41 of the hinge mechanism 20. A switchboard 5 is provided with the plurality of operating keys 5a through 5c.

The receiver case 10 has an open part 10b' in the surface thereof, and is provided with a surface housing 10a; a display panel 11 composed of a liquid crystal display device or the like; a receiver 12 and other parts; and a surface housing 10b that has a display window for exposing the display screen of the display panel 11 and covers the open part of the back surface housing 10a. A receiver 12, a panel control board 14 for controlling the image displayed in the display panel 11, and other components are housed inside the back surface housing 10a. As shown in FIG. 2, the display panel 11, the panel control board 14, and other components are fixed to a support frame 13, and an end part on one side of the support frame 13 is fixed to the first frame 21 of the hinge mechanism 20.

The control circuit boards 3, 14 housed in the transmitter case 2 and the receiver case 10 are connected by flexible lead wires, i.e., a flexible printed wiring board (hereinafter referred to as an FPC) 6, as shown in FIGS. 2 and 3. The FPC 6 is composed of a band-shaped body having a narrow width and a prescribed length in which extremely fine wires are formed inside an insulating film, and the center part thereof is curved in a substantial horseshoe shape. The FPC 6 passes from the control circuit board 3 through one corner 15b in which the hinge mechanism 20 of the transmitter case 2 is connected, and the substantially horseshoe-shaped curved portion is disposed inside the hinge mechanism 20, whereby the FPC 6 is connected through the hinge mechanism 20 to the control circuit board 14 via one corner 16b of the receiver case 10.

As shown in FIGS. 4 and 5, the hinge mechanism 20 is composed of a pair of first and second frames 21, 41 that are attached to the support frames 4, 13 housed in the transmitter and receiver cases 2, 10; a connecting member 30 as a third frame for connecting the first and second frames 21, 41; first and second drive mechanisms 50, 50 for restricting/retaining the driving of the first and second frames 21, 41 when the first and second frames 21, 41 connected by the connecting member 30 are each rotated from the folded position to a prescribed angle; a link mechanism 60 for linking the first and second frames 21, 41 and coordinating the driving of both frames; and stopper mechanisms 70, 70 for maintaining the open state and the closed state during opening and closing of the transmitter case 2 and the receiver case 10.

The components constituting the first and second frames 21, 41, the connecting member 30, the first and second drive mechanisms 50, 50, the link mechanism 60, and the stopper mechanisms 70, 70 are almost all composed of metal rigid bodies, and are formed by stamping out metal panels and pressing curves into the panels. Stainless steel spring material (e.g., SUS304CSP-1/2H) having high strength, high rigidity, and high toughness is preferred as the metal material. The plate thickness of the first and second frames 21, 41 is 1.5 mm, for example, and the plate thickness of the connecting member 30 is 1.2 mm, for example. Forming each component from a metal material in this manner enables the hinge mechanism to have high mechanical strength in comparison to a hinge mechanism that is manufactured from the conventional resin material, and the size of the components can therefore be reduced. The entire hinge mechanism 20 is also formed by a metal rigid body, whereby the support frames 4, 13 are electrically connected, and the reception surface area of an antenna provided to any of the support frames 4, 13 can therefore be increased, and the performance of the antenna can be enhanced.

The first and second frames 21, 41 are housed without providing any protruding parts inside concave parts that are formed in the connecting location of the folded transmitter and receiver cases 2, 10.

As shown in FIGS. 4 and 5, the first frame 21 is composed of a joining piece 26 having a prescribed length, and a pair of first and second arm pieces 22, 24 having a prescribed length that are folded at substantially right angles in the same direction from both ends of the joining piece 26. The first frame 21 is attached to the support frame 13 of the receiver case 10, and has an overall horseshoe shape as viewed in a plane.

The length of the joining piece 26 is shorter than the width of the receiver case 10; joining parts 22a, 24a are formed at the distal end parts in the first and second arm pieces 22, 24; and U-shaped grooves 23c, 25c for inserting an FPC, lead wires, or the like are formed in the arm parts of the first and second arm pieces 22, 24.

The joining part 22a of the first arm piece 22 is a ring-shaped attachment ring having an opening 22b large enough to enable insertion of a cylindrical cap 51. A groove 22c into which a bridge end 53 is inserted is formed in a flange end 52 of the cylindrical cap 51 on the external periphery of the joining part 22a.

The joining part 24a of the second arm piece 24 is composed of a plate-shaped body having a prescribed size, a non-circular attachment hole 24b for attaching a first attachment shaft 72 of a stopper member 71 is formed in the plate-shaped body, and a pair of protrusions 25a, 25b for fixing the stopper member 71 in position is formed in one surface (the surface facing the first arm piece 22) of the plate-shaped body.

The height (height from the plate-shaped body surface) of the protrusions 25a, 25b is shorter than the thickness of the stopper member 71. Specifically, the protrusions 25a, 25b are formed at the rear, and are provided on the external peripheral edge of the second arm piece 24 on an imaginary line in a fan shape that is opened a prescribed angle with the attachment hole 24b at the center. The protrusions 25a, 25b are formed by stamping from the other surface of the second arm piece 24.

The joining piece 26 is in a belt shape, and attachment holes 26a, 26b attached to the support frame 13 are formed near both end parts thereof.

The second frame 41 has substantially the same shape as the first frame 21; is composed of a joining piece 46 having a prescribed length, and a pair of third and fourth arm pieces 42, 44 having a prescribed length that are folded at substantially right angles in the same direction from both ends of the joining piece 46; and is attached to the support frame 4 of the transmitter case 2.

The length of the joining piece 46 is shorter than the width of the transmitter case 2; joining parts 42a, 44a are formed at the distal end parts in the third and fourth arm pieces 42, 44; and U-shaped grooves 43c, 45c for inserting an FPC, lead wires, or the like are formed in the arm parts of the third and fourth arm pieces 42, 44.

The joining part 42a of the third arm piece 42 is a ring-shaped attachment ring having an opening 42b large enough to enable insertion of a cylindrical cap 51. A groove 42c into which a bridge end 53 is inserted is formed in a flange end 52 of the cylindrical cap 51 on the external periphery of the joining part 42a.

The joining part 44a of the fourth arm piece 44 is composed of a plate-shaped body having a prescribed size, and a non-circular attachment hole 44b for attaching the stopper member 71 is formed in the plate-shaped body, and a pair of protrusions 45a, 45b for fixing the stopper member 71 in position is formed in one surface (the surface facing the third arm piece 42) of the plate-shaped body.

The height of the protrusions 45a, 45b is the same as that of the protrusions 25a, 25b of the first frame. The protrusions 45a, 45b are formed at the rear, and are provided on the external peripheral edge of the fourth arm piece 44 on an imaginary line in a fan shape that is opened a prescribed angle with the attachment hole 44b at the center. The protrusions 45a, 45b are formed by stamping from the other surface of the fourth arm piece 44.

The joining piece 46 is in a belt shape, and U-shaped grooves 46a, 46b for attachment to the support frame 4 are formed near both end parts thereof.

As shown in FIGS. 4 and 5, the connecting member 30 has a joining piece 31 having a shorter length than the joining piece 26 of the first frame 21, and first and second connecting pieces 32, 33 that are folded at substantially right angles in the same direction from both ends of the joining piece 31, and the first and second connecting pieces 32, 33 and the joining piece 31 are integrally joined. The first and second connecting pieces 32, 33 are composed of substantially oblong elliptical plate-shaped bodies that are branched to the left and right, a portion of the external peripheral edge of the center part in the longitudinal direction is joined to the end part of the joining piece 31, and the left and right of the joining part as the center form the first and third joining parts 34, 36 and the second and fourth joining parts 35, 37.

A fixing hole 38 for attaching the actuation bar 61 of the link mechanism 60 described hereinafter is formed in the substantial center of the first connecting piece 32. Attachment holes 34a, 36a through which an actuation stick 67 is inserted are formed in the first and third joining parts 34, 36, and a plurality of cams 34b, 36b are integrally formed by pressing or the like in the external surface, i.e., the surface that faces the internal surface of the first and third arm pieces 22, 42 when assembled. The cams 34b, 36b are formed in radial fashion about the attachment holes 34a, 36a.

The second connecting piece 33 is provided with second and fourth joining parts 35, 37, and attachment holes 35a, 37a in which second attachment shafts 73, 73 provided to the stopper members 71, 71 are mounted, and locking protrusions 35b, 37b provided to the external edge parts of the second and fourth joining parts 35, 37 for limiting the rotation of the stopper members 71, 71 to a prescribed angle in the state in which the stoppers members 71, 71 are mounted are each formed in the second connecting piece 33. Consequently, when the stopper members 71, 71 are rotated a prescribed angle, locking tabs 71a, 71b collide with the locking protrusions 35b, 37b, and the rotation is limited. This rotation limiting limits the rotation of the second and fourth arm pieces 24, 44, i.e., the rotation of the first and second frames 21, 41.

Specifically, since the stopper members 71, 71 are fixed so as to be prevented from rotating in the attachment holes 24b, 44b of the second and fourth arm pieces 24, 44, and the protrusions 25a, 25b, 45a, 45b, when the second and fourth arm pieces 24, 44 are rotated, the stopper members 71, 71 also rotate in conjunction with this rotation, and when the stopper members 71, 71 have rotated to a prescribed angle, the locking tabs 71a, 71b of the stopper members 71, 71 collide with the locking protrusions 35b, 37b, and the rotation is limited.

The height of the locking protrusions 35b, 37b is lower than the thickness of the stopper member 71 described hereinafter, and the locking protrusions 35b, 37b are formed at the bottom parts of the second and fourth joining parts 35, 37, respectively. The length obtained by adding the heights of both protrusions is slightly shorter than the thickness of the stopper member 71 so that the protrusions 25a, 25b, 45a, 45b provided to the second and fourth arm pieces 24, 44, and the locking protrusions 35b, 37b provided to the second and fourth joining parts 35, 37 do not touch each other.

The stopper mechanism 70 will first be described hereinafter.

The stopper mechanism 70 is composed of the pair of stopper members 71, 71 fixed to the first and second frames 21, 41, and the locking protrusions 35b, 37b that come into contact with and limit the rotation of the stopper members 71, 71 in conjunction with the rotation of the first and second frames 21, 41.

Since the stopper members 71, 71 both have the same structure, the stopper member 71 attached to the second arm piece 24 will be described hereinafter. However, the stopper member 71 attached to the second arm piece 24, and the stopper member 71 attached to the fourth arm piece 44 are disposed so as to have left-right symmetry about the connecting member 30.

The stopper member 71 has a substantially circular shape in which the locking tabs 71a, 71b protrude in the direction of the normal lines from two locations of the external peripheral edge of a plate-shaped body having a prescribed thickness, and is substantially crescent shaped in plan view. The stopper member 71 has first and second attachment shafts 72, 73 in the substantial center of the back surface thereof, and the crescent-shaped distal end part forms the locking tabs 71a, 71b. The locking tabs 71a, 71b are separated a prescribed angle θ (not shown) about the first attachment shaft 72. The first attachment shaft 72 is formed in a non-circular shape so as to be fit into the attachment hole 24b of the second arm piece 24, and stops rotation fitting into the attachment hole 24b. The second attachment shaft 73 has a girth that allows insertion into the attachment hole 35a of the second joining part 35, and is slightly longer than the thickness of the second joining part 35. The distal end part of the second attachment shaft 73 inserted in the attachment hole 35a is formed so that the second attachment shaft 73 is fixed so as to be able to rotate in the attachment hole 35a. The angle θ formed by the locking tabs 71a, 71b is the angle obtained by equally dividing the desired maximum rotation angle when the locking tabs 71a, 71b are installed in the mobile telephone 1, and adding the extension angle in the circumferential direction of the locking protrusions 35b, 37b to the angle, for example.

The stopper member 71 is fabricated from a metal material, particularly stainless steel having high mechanical strength. When the stopper member 71 is fabricated from such a metal member, the locking tabs 71a, 71b are locked by the locking protrusions 35b, 37b even when an excessive force is applied to one of the first and second frames 21, 41, and breakage therefore does not easily occur.

Through holes (not shown) through which the first and second attachment shafts 72, 73 also pass may be formed in the shaft center parts of the stopper members 71, 71, and a coaxial cable for electrically connecting the transmitter and receiver cases 2, 10 is inserted through the through holes to form a connection between the substrates.

The drive mechanism 50 will next be described.

Drive mechanisms 50, 50 are provided to the joining part 22a of the first arm piece 22 of the first frame 21, and to the joining part 42a of the third arm piece 42 of the second frame 41. The drive mechanisms 50, 50 are provided with a cam mechanism for restricting/retaining the first and second frames 21, 41 in a prescribed position, and a spring body for driving the cam mechanism; and the frames are intermittently moved in accordance with the rotation of the first and second frames 21, 41. Since the drive mechanisms provided to the first arm piece 22 and the third arm piece 42 have the same configuration, the same reference numerals are used, and only the drive mechanism 50 attached to the first arm piece 22 will be described hereinafter.

The cam mechanism is composed of cams 34b provided to the mounting surface 34, and a disk-shaped cam plate 55 that has a cam 55b on one surface for meshing with the cams 34b. A spring body pushing part 54 pushed by a spring body (not shown) in which one end thereof is provided inside the cylindrical cap 51 is provided to the cam plate 55, and the other end is integrally fixed to a rod-shaped actuation stick 67 that is connected to the link mechanism 60. The spring body pushing part 54 of the cam plate 55 has a prescribed thickness and a diameter substantially the same as the diameter of the open part of the cylindrical cap 51, and a plurality of cams 55b is formed in radial fashion from the actuation stick 67 on the internal surface of the spring body pushing part 54, i.e., the surface that faces one surface of the first joining part 34. The cam plate 55 is provided with concave parts 55a between the cams 55b so as to mesh with the cams 34b of the first joining part 34. In the same manner, concave parts 34c are provided between the plurality of cams 34b provided to the external surface of the first joining part 34. The cylindrical cap 51 is fixed inside the attachment hole 22b of the joining part 22a by the bridge piece 53, and the spring pushing part 54 of the cam plate 55 is fixed to the cylindrical cap 51. The cam plate 55 therefore rotates in conjunction with the rotation of the first frame 21. The rear end parts of the cylindrical caps 51 protrude from the first and third arm pieces 22, 42, but the rear end parts are housed in the other corners 15a, 16a of the transmitter and receiver cases 2, 10 during assembly.

The cams 34b, 55b are preferably provided in accordance with the angle when the mobile telephone 1 is in the open state. For example, when the open state of the mobile telephone 1 is 160°, the transmitter and receiver cases 2, 10 are fixed at the moment the cams mesh when the intervals between the cams are set to 160° or at every 80°, the transmitter and receiver cases 2, 10 are stable in the open state, the closed state, and in between the open state and the closed state.

Through this configuration, when the first and second frames 21, 41 are rotated, the cam plate 55 of the drive mechanism 50 rotates, and the cams 55b provided to the cam plate 55 move against the urging force of the spring body so as to run over the meshed cams 34b, 36b of the first and third joining parts 34, 36. Suitable resistance is thereby created when the cams are not meshed together, and a snap action is created during rotation.

The link mechanism 60 will next be described.

The link mechanism 60 is provided with a pair of cam bridge pieces 65 provided to the first and third arm pieces 22, 42, that have a protruding rod 65a on one surface thereof and rotate in coordinated fashion with the rotation of the first and third arm pieces 22, 42; a restricting plate 63 fixed to the first connecting piece 32 of the connecting member 30; an actuation bar 61 for linking the rotation of the first and third arm pieces 22, 42, composed of an elongated rod-shaped body fixed to the connecting member 30 so as to be able to rotate by a shaft rod 61a provided to the center part, in which both end parts of the actuation bar 61 are fixed to the protruding rod 65a that is passed through restricting holes 63a, 63b provided to the restricting plate 63; and when any one of the drive mechanisms 50, 50 is driven, the other drive mechanism is operated in coordinated fashion.

The cam bridge pieces 65 are fixed to the first and third arm pieces 22, 42 by fixing members 68 provided to the distal end parts of the actuation stick 67, and are coordinated with the drive mechanisms 50, 50 provided to both arm pieces. Small protrusions 69 that are locked in locking holes 64a, 64b of the restricting plate 63 are provided to the distal end parts of the fixing member 68. The cam bridge pieces 65 are substantially half-moon shaped, protruding rods 65a for engaging with the restricting holes 63a, 63b of the restricting plate 63 are formed in positions at a prescribed distance from the rotational axis of the internal surfaces of the cam bridge pieces 65, and the protruding rods 65a slide in an arc in accordance with the rotation of the cam bridge pieces 65.

The restricting plate 63 is composed of a substantially elliptical plate-shaped body having substantially the same length and width as the first connecting piece 32, and is provided with locking holes 64a, 64b into which the small protrusions 69 provided to the distal end part of the fixing member 68 are locked at both end parts in the longitudinal direction of the disk-shaped body, and restricting holes 63a, 63b into which the protruding rods 65a are inserted, that are composed of narrow groove openings formed in curved fashion through a prescribed angle about the locking holes. The protruding rods 65a inserted in the restricting holes 63a, 63b can slide in the holes, and the movement thereof is restricted to a prescribed position.

The actuation bar 61 is composed of a rod-shaped body having substantially the same length as the restricting plate 63. Elliptical holes 62a, 62b provided with a prescribed length of play in the longitudinal direction are provided to both end parts of the actuation bar 61, and the protruding rods 65a of the cam bridge pieces 65 are inserted in the holes 62a, 62b.

In the link mechanism 60 configured as described above, when the hinge mechanism 20 is moved by rotating the first frame 21 from the open state to the closed state, the cam bridge pieces 65 connected to the first arm piece 22 rotate in conjunction with the rotation of the rotated first frame 21, whereby the protruding rods 65a of the cam bridge pieces 65 move within the restricting holes 63a, 63b in the counterclockwise direction as viewed from the right. In conjunction with this rotation, a force in the counterclockwise direction is also applied to the hole 62a on an end on one side of the actuation bar 61, and the actuation bar 61 rotates in the clockwise direction about the shaft rod 61a. A force in the clockwise direction is then applied to the protruding rods 65a of the cam bridge pieces 65 connected to the third arm piece 42, which are connected to hole 62b on an end on the other side of the actuation bar 61, whereby the cam bridge pieces 65 move in the clockwise direction, and the third arm piece 42 rotates clockwise in the same manner in conjunction with this movement. The first frame 21 and the second frame 41 thereby rotate in opposite directions from each other. Since it is apparent that the same operation also occurs during movement from the closed state to the open state, this operation will not be described.

Assembly of the hinge mechanism 20 will next be described with reference to FIGS. 4 and 5.

The stopper members 71, 71 are first mounted to the second connecting piece 33 of the connecting member 30. In the mounting of the stopper members 71, the second attachment shafts 73 of the stopper members 71 are inserted in the attachment holes 35a, 37a provided to the first second and fourth joining parts 35, 37 of the second connecting piece 33, and lugs are formed at the tips of the shafts so that the shafts do not come out of the attachment holes 35a, 37a. FIGS. 4 and 5 show a state in which the lugs are already formed.

The cylindrical cap 51 is inserted from the inside of the attachment holes 22b, 42b of the first and third arm pieces 22, 42, and the flange end 52 of the cylindrical cap 51 is inserted and positioned in the grooves 22c, 42c of the first and third arm pieces 22, 42. A coiled spring body (not shown) is then inserted into the cylindrical cap 51. The spring body pushing part 54 of the cam plate 55 is inserted/fixed in the cylindrical cap 51, and the connecting member 30 and the first and second frames 21, 41 are then attached. In this attachment, the cam plate 55 pressed by the spring body is pushed against the spring body, and in this state, the first through fourth joining parts 34 through 37 of the connecting member 30 are positioned between the first and third arm pieces 22, 42 and the second and fourth arm pieces 24, 44, the first attachment shafts 72, 72 of the stopper members 71, 71 mounted to the second and fourth joining parts 35, 37 of the second connecting piece 33 are inserted into the attachment holes 24a, 44a of the second and fourth arm pieces 24, 44 and attached so as to be prevented from rotating, and the locking tabs 71a, 71b of the stopper members 71, 71 are brought into contact with and fixed to the protrusions 25a, 25b and 45a, 45b.

The actuation stick 67 is inserted through the attachment holes 34a, 36a and the center part of the cam plate 55 so as to reach the bottom part of the internal surface of the cylindrical cap 51, and the cams 34b, 36b of the first and third joining parts 34, 36 are meshed with the cams 55b of the cam plate 55. The cam bridge pieces 65 are then mounted to the actuation stick 67. In this mounting, the actuation stick 67 is inserted through the cam bridge pieces 65, the fixing member 68 is attached to the distal end part of the actuation stick 67, and the cam bridge pieces 65 are fixed to the fixing member 68 so as to be prevented from rotating. The shaft rod 61a of the actuation bar 61 is inserted into the fixing hole 38 via a passage hole 64c of the restricting plate 63 so as to be able to rotate, and is then inserted to the small protrusion 69 at the distal end part of the fixing member 68 through the locking holes 64a, 64b of the restricting plate 63. Furthermore, the protruding rods 65a of the cam bridge pieces 65 are inserted through the holes 63a, 63b of the restricting plate 63, and the holes 62a, 62b formed at both end parts of the actuation bar 61, and lugs are formed at the distal ends of the protruding rods.

Figure 6:
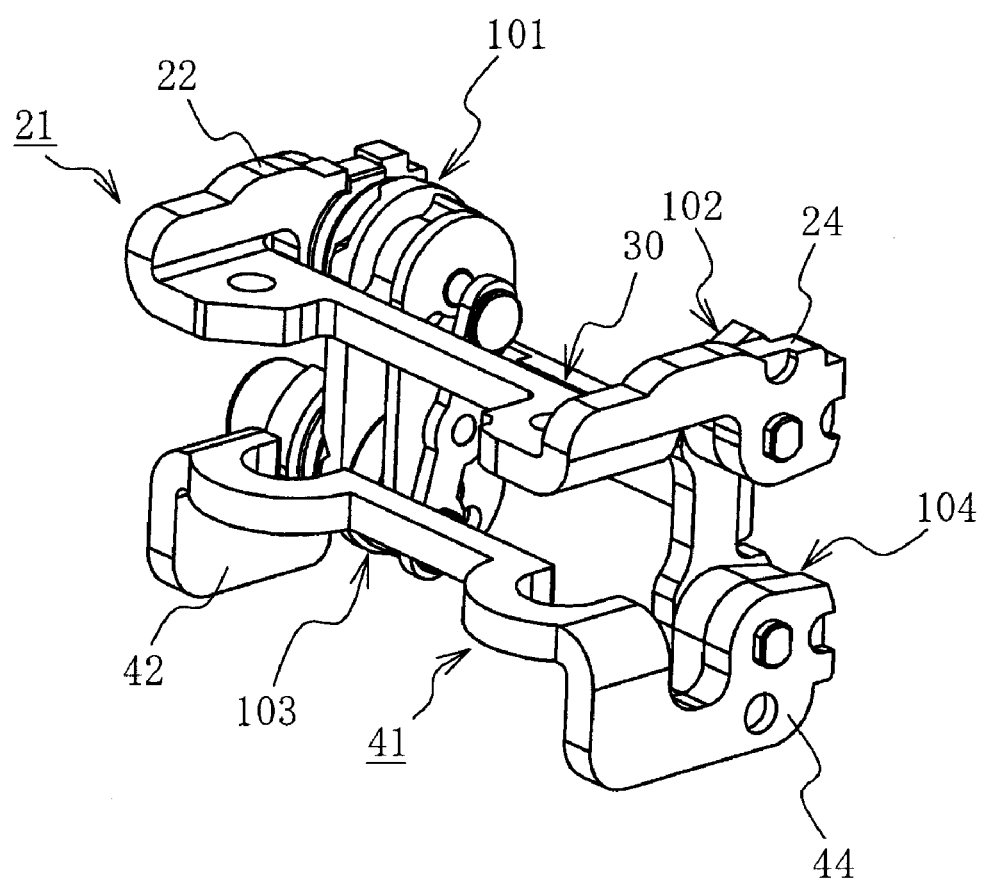
FIG. 6 is a perspective view showing a case in which the hinge mechanism is closed when the hinge mechanism shown in FIGS. 4 and 5 is in the assembled state.
Figure 7:
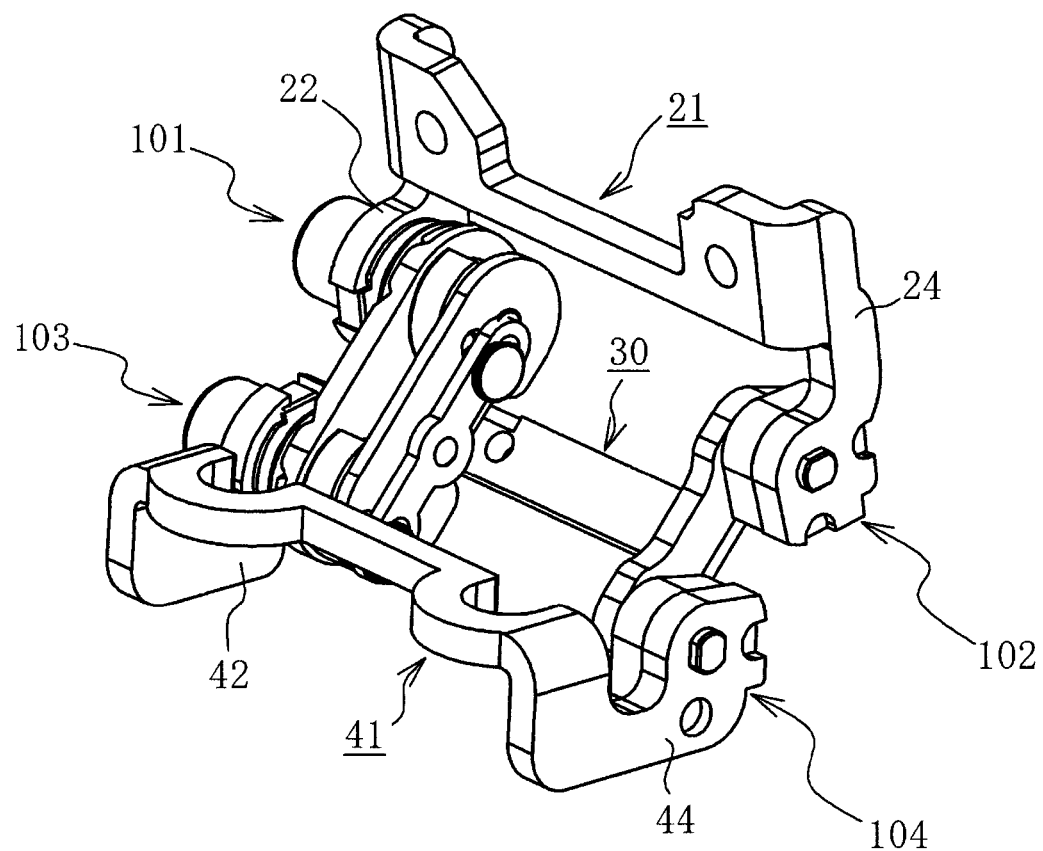
FIG. 7 is a perspective view showing a case in which the hinge mechanism is between opening and closing when the hinge mechanism shown in FIGS. 4 and 5 is in the assembled state.
Figure 8:
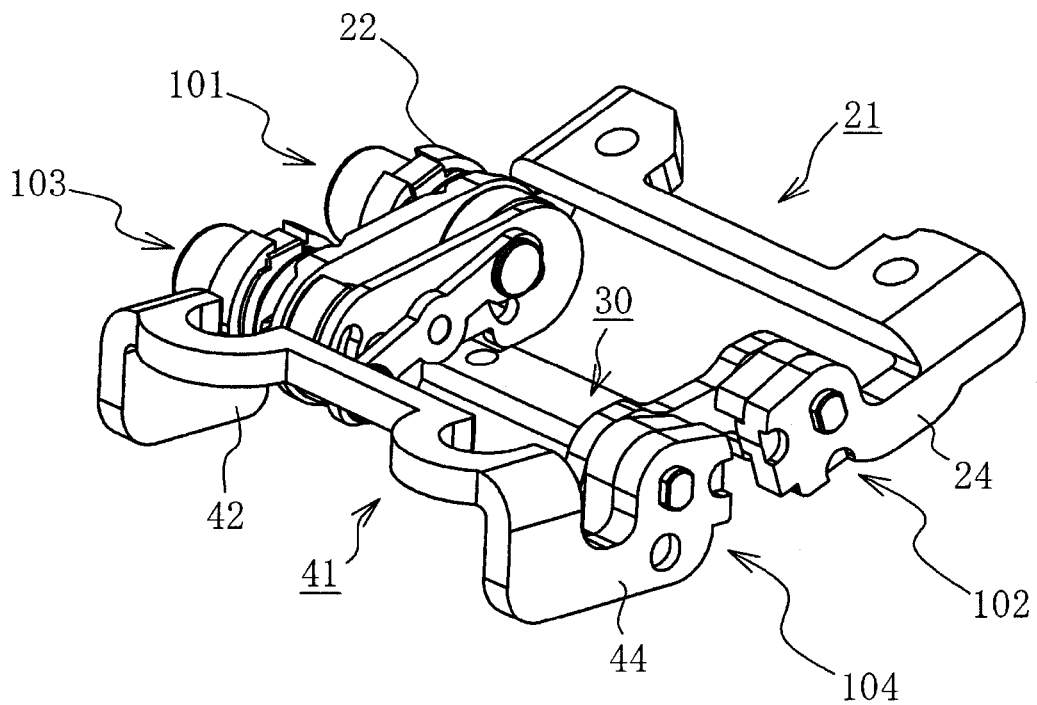
FIG. 8 is a perspective view showing a case in which the hinge mechanism is open when the hinge mechanism shown in FIGS. 4 and 5 is in the assembled state.

FIGS. 6 through 8 show the assembled state of the hinge mechanism shown in FIGS. 4 and 5. FIG. 6 is a perspective view showing a case in which the hinge mechanism is closed; FIG. 7 is a perspective view showing a case in which the hinge mechanism is between opening and closing; and FIG. 8 is a perspective view showing a case in which the hinge mechanism is open.

In the assembled hinge mechanism 20 as shown in FIGS. 6 through 8, the connecting member 30 and the first and second frames 21, 41 are integrally formed by a first connecting part 101 in which the first arm piece 22 and the first joining part 34 are connected, a second connecting part 102 in which the second arm piece 24 and the second joining part 35 are connected, a third connecting part 103 in which the third arm piece 42 and the third joining part 36 are connected, and a fourth connecting part 104 in which the fourth arm piece 44 and the fourth joining part 37 are connected. The drive mechanism 50 and the link mechanism 60 are provided to the first and third connecting parts 101, 103, and the stopper mechanism 70 is provided to the second and fourth connecting parts 102, 104.

Figure 9A:
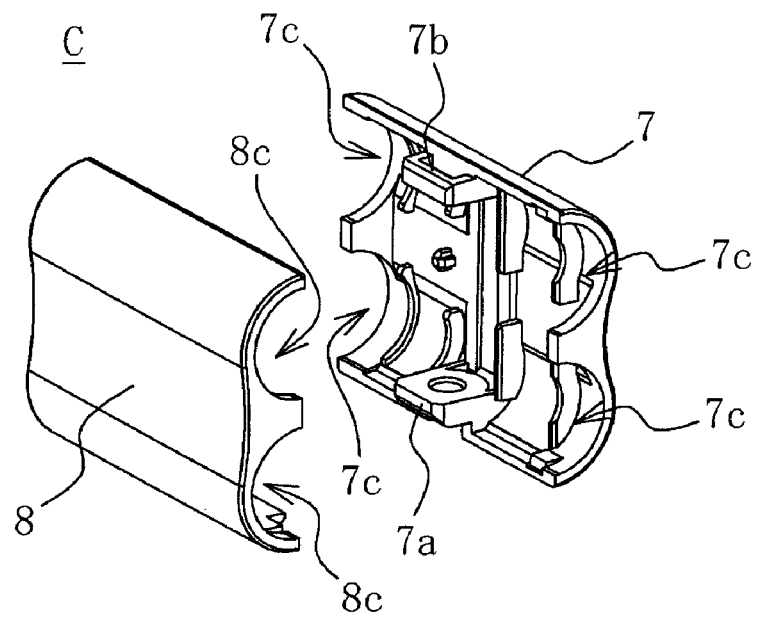
Figure 9B:
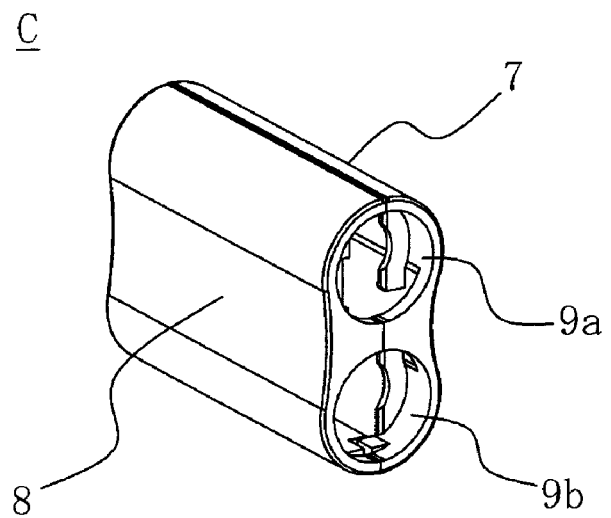
Figure 10A:
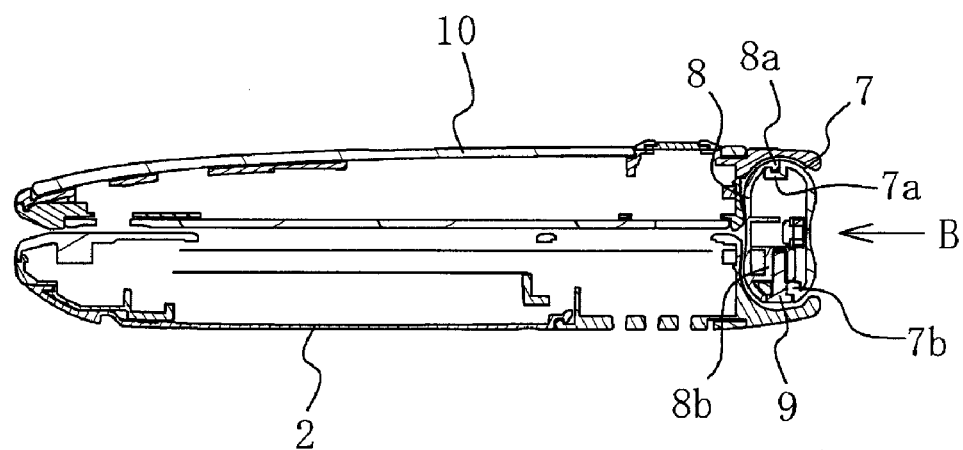
Figure 10B:
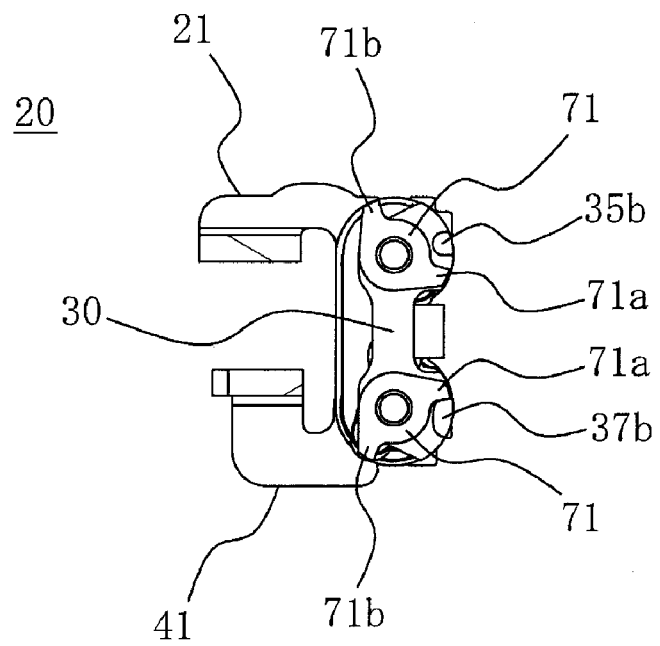
Figure 11A:
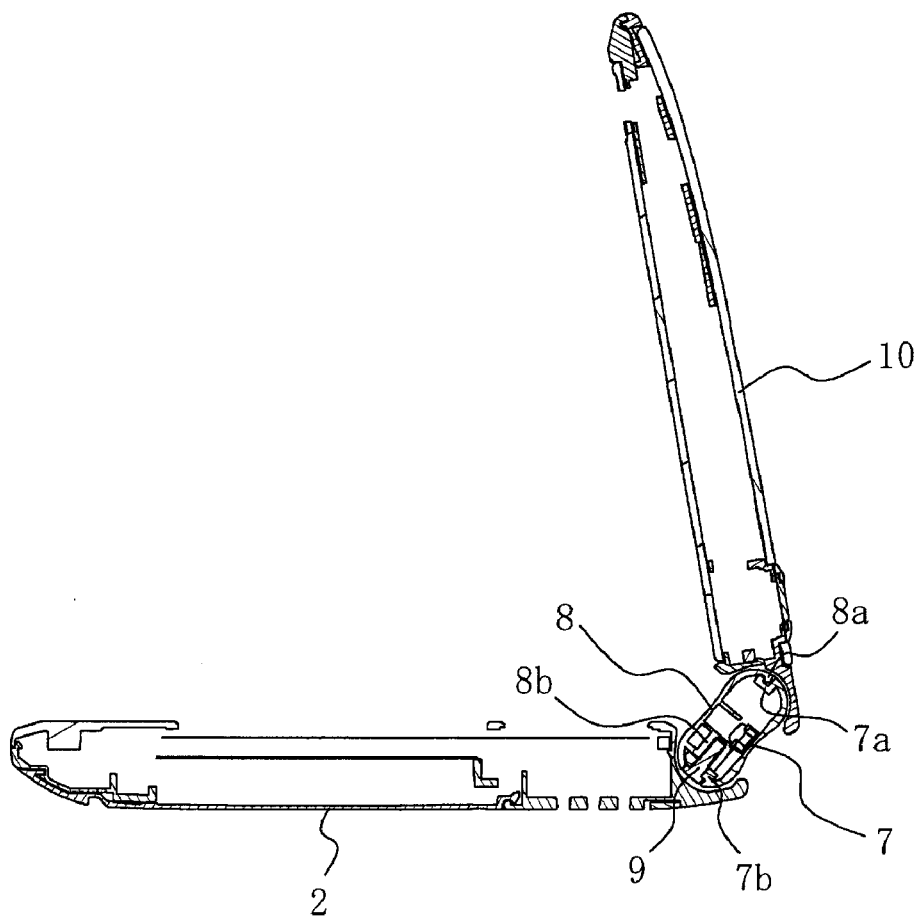
Figure 11B:
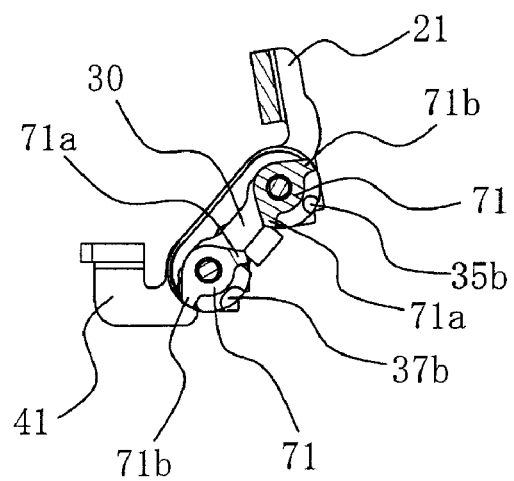

FIG. 9 is a diagram showing the hinge cover for covering the hinge mechanism, wherein FIG. 9A is an exploded perspective view, and FIG. 9B is an assembled perspective view. FIG. 10 is a diagram showing the relationship between the hinge mechanism and the folded state of the transmitter and receiver cases, wherein FIG. 10A is a side sectional view showing a state in which both cases are folded in a state in which the transmitter and receiver cases of FIG. 1 are cut along line A-A, and FIG. 10B is an enlarged side sectional view showing the hinge mechanism in the state shown in FIG. 10A. FIG. 11 is a diagram showing a state in which the transmitter and receiver cases of FIG. 10 are opened to 80°, wherein FIG. 11A is a side sectional view, and FIG. 11B is an enlarged side sectional view showing the hinge mechanism in the state shown in FIG. 11A. FIG. 12 is a diagram showing a state in which the transmitter and receiver cases of FIG. 10 are opened to 160°, wherein FIG. 12A is a side sectional view, and FIG. 12B is an enlarged side sectional view showing the hinge mechanism in the state shown in FIG. 12A. The link mechanism is omitted in FIGS. 10A, 11A, and 12A so as to make the shape of the housing in the connecting parts easier to recognize, and the hinge mechanism 20 in FIGS. 10B, 11B, and 12B is cut at a prescribed position to make the stopper member visible.

As shown in FIG. 9A, the hinge cover C is composed of a pair of box-shaped cover members 7, 8 having a cross-section that is substantially half-oval shaped in the direction orthogonal to the rotation shaft of the hinge mechanism 20, and when the hinge cover C is attached to the mobile telephone 1, the hinge cover C covers the hinge mechanism 20 between the cover members from the surface and the back surface of the mobile telephone 1. Specifically, as shown in FIG. 9B, the cover members 7, 8 are attached in contact with each other so that the open parts thereof face each other.

In the cover members 7, 8, hook-shaped locking parts 7a, 8a are formed at the end parts on one side in the direction orthogonal to the rotation shafts of the hinge mechanism 20, and locking screw fastening holes 7b, 8b are formed at the end parts on the opposite side. The cover members 7, 8 are attached by inserting the locking parts 7a, 8a in the locked state thereof through the locking screw fastening holes 7b, 8b and screwing the locking screw fastening holes 7b, 8b together through the use of a locking screw 9. In the state in which the hinge mechanism 20 is attached to the transmitter and receiver cases 2, 10, the first through fourth arm pieces 22, 24, 42, 44 of the first and second frames 21, 41 are disposed inside the corners 15a through 16b of the transmitter and receiver cases 2, 10. Since the hinge cover C is attached between the corners 15a through 16b of the transmitter and receiver cases 2, 10, the substantially circular notches 7c, 8c are each provided in accordance with the shape of the first through fourth connecting parts 101 through 104 in the position in which the end parts on both sides in the minor axis direction of the pair of cover members 7, 8 cover the first through fourth connecting parts 101 through 104, and the first through fourth connecting parts 101 through 104 are inserted through the passage holes 9a, 9b formed by the notches 7c, 8c.

Furthermore, a sleeve is preferably provided at the position of the passage holes 9a, 9b of the first through fourth connecting parts 101 through 104, because there is no risk of the passage holes 9a, 9b impeding the opening and closing of the transmitter and receiver cases 2, 10.

Furthermore, the thickness of the hinge cover C in the state in which both cover members 7, 8 are attached is substantially the same as or slightly less than the thickness of the transmitter and receiver cases 2, 10. This is to prevent the hinge cover C from protruding towards the surface of the mobile telephone 1, and this thickness is preferably provided so that the surface position of the hinge cover C approaches the extension line of the surface position of the transmitter and receiver cases 2, 10. The bottom surface of the box-shaped cover member 8 on the surface side is also made flat, whereby the surface from the transmitter case 2 to the hinge cover C and the receiver case 10 is a connected surface that flexes in stepwise fashion when the mobile telephone 1 is in the open state or an intermediate position.

The bottom surface of the cover member 7 on the back side is also flat. This flat surface enables an image to be captured without the use of a specialized instrument for fixing the camera when timer shooting or the like is to be performed using the camera function of the mobile telephone 1, by setting the mobile telephone 1 down in the folded state using the bottom surface of the cover member 8 as the resting surface.

As shown in FIGS. 10A, 11A, and 12A, since one cover member 7 is fixed by the screw 9 to the joining piece 31 of the connecting member 30, the hinge cover C is stabilized with respect to the hinge mechanism 20, and the hinge cover C no longer moves to the left and right or other directions inside the corners 15a through 16b.

The locking screw fastening holes 7b, 8b are thus provided to the side end parts in the longitudinal direction in the vicinity of the transmitter case 2 or the receiver case 10, whereby the screw 9 is not exposed from the transmitter case 2 and the receiver case 10 in any of the folded state (see FIG. 10A) of the transmitter and receiver cases 2, 10 and a state in which the transmitter and receiver cases 2, 10 are opened to a prescribed angle (see FIGS. 11A and 12A). Specifically, since the screw 9 cannot be seen from the outside, the aesthetic characteristics can be enhanced.

As shown in FIGS. 6 and 10B, the hinge mechanism 20 in the folded state of the transmitter and receiver cases 2, 10 is in a state in which the first and second frames 21, 41 are substantially parallel. Specifically, among the stopper members 71, 71, the locking tab 71a of the stopper member 71 provided to the fourth connecting part 104 is in contact with the locking protrusion 37b of the fourth joining part 37 of the connecting member 30, and the locking tab 71a of the stopper member 71 provided to the second connecting part 102 is positioned at a slight distance from the locking protrusion 35b of the second joining part 35. Specifically, when the mobile telephone 1 is in the closed state, only one of the locking tabs 71a of the two stopper members 71 makes contact with the locking protrusion 37b. This means that when the opening and closing angle of the transmitter and receiver cases 2, 10 of the mobile telephone 1 is 160°, for example, an angle slightly (e.g., about one to three degrees, i.e., about 0.5 to 1.5° for each rotation shaft) larger than 160° is set for the opening and closing angle restricted by the stopper member 71. By making the angle restricted by the stopper member 71 larger than the actual opening and closing angle, since there is no restriction by the stopper member 71 in the closed state, for example, the transmitter case 2 and the receiver case 10 can be urged by the drive mechanism 50 so as to push against each other. A gap can thereby be prevented from forming between the transmitter and receiver cases 2, 10 in the closed state. A case in which one of the stopper members 71, 71 is in contact was described herein, but a configuration may also be adopted in which a slight gap (0.5 to 1.5°, preferably 1°, about the rotation shaft) is provided between both stopper members. In this case, the cases 2, 10 are supported by coming in contact with each other in the closed state or the open state of the transmitter and receiver cases 2, 10.

When one case, e.g., the receiver case 10, is subsequently rotated a prescribed angle from the folded state, the other transmitter case 2 also rotates to the same angle in the opposite direction. For example, when the transmitter and receiver cases 2, 10 are opened to 80° as shown in FIGS. 7 and 11A, the first and second frames 21, 41 in the hinge mechanism 20 rotate with respect to the connecting member 30 to substantially the same angle, e.g., 40° each, in opposite directions from each other, as shown in FIG. 11B.

Furthermore, when the transmitter and receiver cases 2, 10 are rotated and opened to the open state of 160°, the first and second frames 21, 41 in the hinge mechanism 20 rotate with respect to the connecting member 30 80° each from each other as shown in FIGS. 8 and 12B. In the 160° open state, the corners 15a, 15b, 16a, 16b of the transmitter and receiver cases 2, 10 come in contact, whereby the open state is maintained, and the stopper members 71, 71 are positioned at a slight gap (2° with respect to the locking protrusions 35b, 37b. However, it is also apparent that a configuration may be adopted in which such a slight gap is not provided in the open state, the transmitter and receiver cases 2, 10 make contact, and the stopper members 71, 71 also make contact with the locking protrusions 35b, 37b.

In the mobile telephone 1 of the present example thus configured, a continuous surface that folds in stepwise fashion is formed from the transmitter case 2 along the hinge cover C and the receiver case 10 during the transition from the closed state to the open state. A smoothly curving state is therefore observed from the side, and the design is also enhanced.

Figure 13:
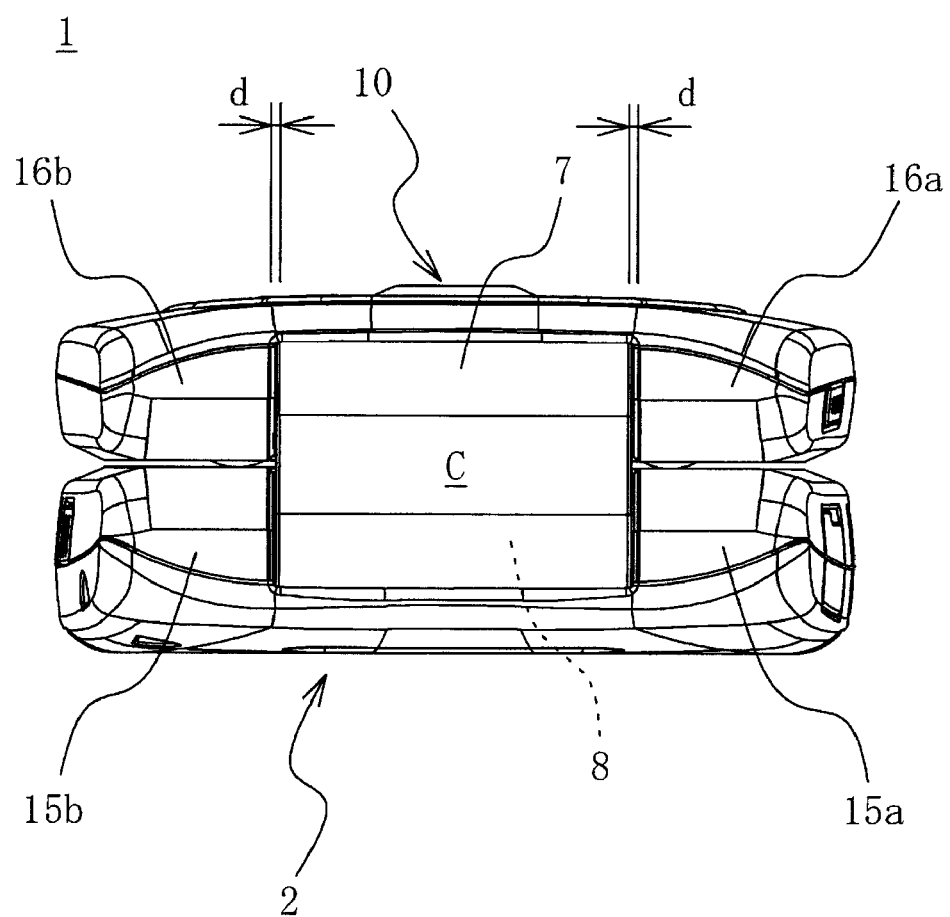
FIG. 13 is a side view from the B direction in FIG. 10A.
Figure 15:
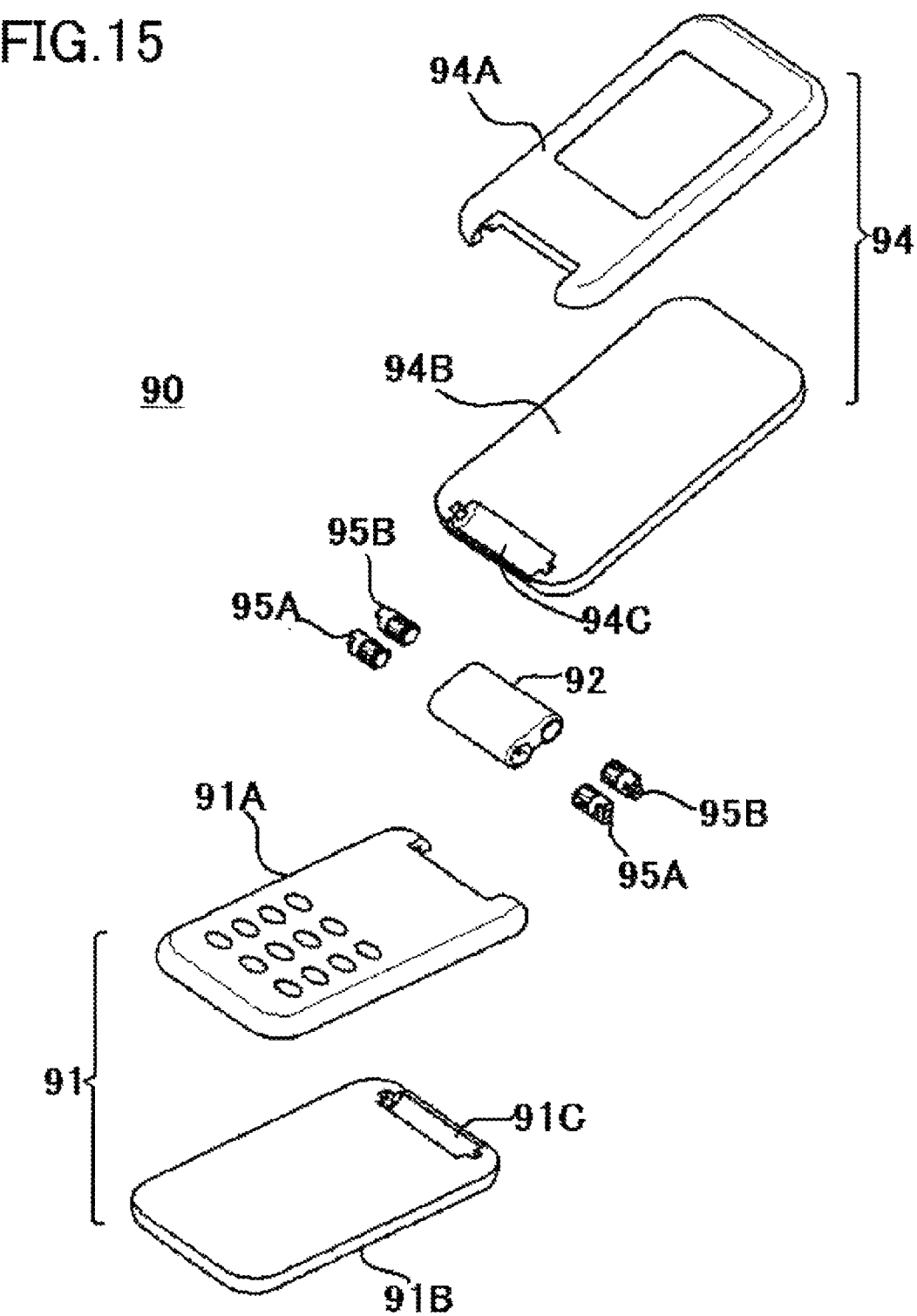
FIG. 15 is an exploded perspective view showing the mobile telephone according to the conventional technique.
Figure 16A:
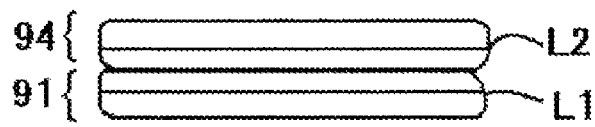
Figure 16B:
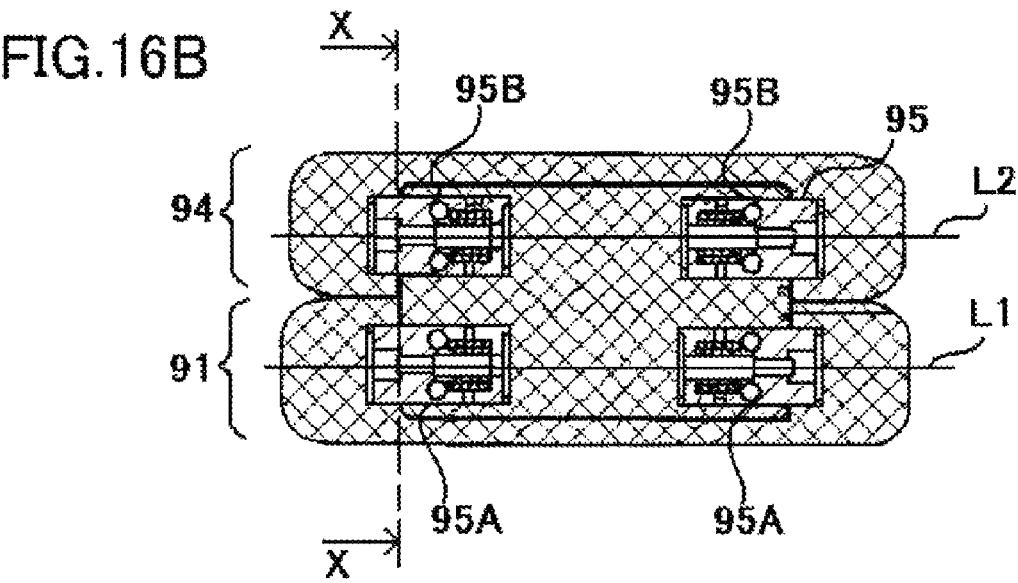
Figure 16C:
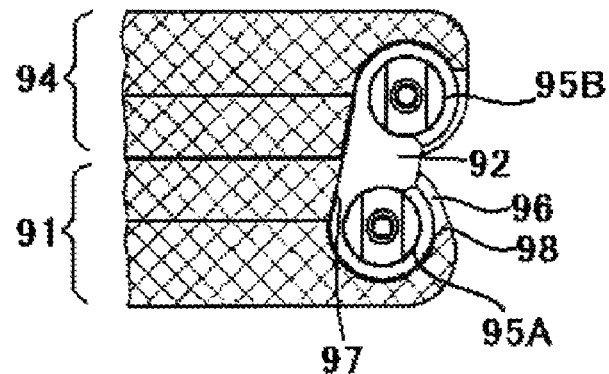

FIG. 13 is a side view from the B direction of FIG. 10A. As shown in this diagram, when the hinge mechanism 20 is covered by the cover members 7, 8, the length in the width direction of the gap in which the hinge mechanism 20 sandwiched by the corners 15a, 15b and 16a, 16b of the transmitter and receiver cases 2, 10 is connected is greater than the length in the width direction of the cover members 7, 8 that constitute the hinge cover C. Small gaps having a prescribed length d are formed between the lateral ends of the cover members 7, 8 and the corners 15a, 15b and 16a, 16b of the transmitter and receiver cases 2, 10. When gaps are formed in these positions, there is no frictional sound, e.g., creaking sound, of rubbing between the transmitter and receiver cases 2, 10 and the cover members 7, 8 during opening and closing of the transmitter and receiver cases 2, 10. The small gaps are preferably structured so as to prevent contamination by dust and the like. Since one cover member 7 is fixed by the screw 9 to the joining piece 31 of the connecting member 30, a constant length is maintained in the small gaps formed between the lateral ends of the cover members 7, 8 and the corners 15a, 15b and 16a, 16b of the transmitter and receiver cases 2, 10.

As described above, since the rotation of the first and second frames 21, 41 is linked in opposite phase with respect to the connecting member 30 by the link mechanism 60 in the hinge mechanism of the present example, there is no rotation of only one frame, and the rotations of both frames are always linked. A stable opening and closing operation can therefore be obtained, and the transmitter and receiver cases 2, 10 do not become misaligned in the closed state.

In the present example, the drive mechanism 50 was provided in the two locations of the first and third connecting parts 101, 103, but any number of drive mechanisms may be provided to any of the first through fourth connecting parts 101 through 104. However, since play or rattling occurs due to backlash when only one drive mechanism 50 is provided, one drive mechanism is preferably provided for each rotation shaft. The link mechanism 60 was also provided to the first and third connecting parts 101, 103 to which the drive mechanism 50 was provided, but the link mechanism may be provided to any connecting part insofar as the first frame 21 and the second frame 41 can be linked. The link mechanism is preferably provided so as to link the first arm piece 22 and the third arm piece 42, or the second arm piece 24 and the fourth arm piece 44, because the installation occupies the least amount of space.

The stopper mechanism 70 was also provided to the second and fourth connecting parts 102, 104 in the present example, but any number of stopper mechanisms may be provided to any of the connecting parts. However, a stopper mechanism is preferably provided for each rotation shaft, in the same manner as the drive mechanism. It is apparent to those skilled in the art that the stopper mechanism 70 may be provided to a connecting part to which the drive mechanism 50 and the link mechanism 60 are also provided.

The mobile telephone described above is configured so that the hinge mechanism does not protrude from the surface of the mobile telephone in the open state, and two rotation shafts always rotate to the same angle in opposite phases. Therefore, the rotation operation can be performed stably and smoothly, and the surface forms a gradual curve in the open state and the closed state. A mobile telephone having enhanced design is therefore obtained.

The invention claimed is:

1. A foldable device, comprising:
a pair of device cases each having an end side extending between a first corner and a second corner;
a hinge mechanism for pivotally connecting the end sides of the pair of device cases with each other; and
a hinge cover for covering said hinge mechanism,
wherein said first and second corners of said end side of each of said pair of device cases to which the hinge mechanism is connected protrude a prescribed length in a direction orthogonal to said end side, and said hinge mechanism is attached between said first and second protruding corners of said pair of device cases;
wherein said hinge cover comprises a pair of box-shaped cover members, each of the box-shaped cover members having a cross-section that is substantially half-oval shaped in a direction orthogonal to said end side;
wherein said cover members constituting the pair are disposed facing each other so as to sandwich and thereby cover said hinge mechanism positioned between said first and second protruding corners of said pair of device cases; and
wherein fixing means is provided for fixing said pair of cover members with respect to each other in an area adjacent to said end side of at least one of said pair of device cases when said cover members are disposed facing each other.

2. The foldable device according to claim 1, wherein each of said cover members has a locking screw fastening opening;
wherein said fixing means comprises a pair of the locking screw fastening openings which communicate with each other when said pair of cover members are disposed facing each other, at least one of the locking screw fastening openings having a screw hole; and
wherein said pair of cover members is fixed by screwing of a locking screw into the screw hole through said pair of locking screw fastening openings of said pair of cover members.

3. The foldable device according to claim 1, wherein said fixing means is provided to an area adjacent to said end side of one of said pair of device cases; and
wherein said fixing means has a hook-shaped locking part.

4. The foldable device according to claim 1, wherein a length of said pair of cover members in a direction of said end side of each of said pair of device cases is a prescribed length shorter than a length between the first and second corners of each end side of said pair of device cases.

5. The foldable device according to claim 1, wherein said hinge mechanism has a first rotation shaft provided between said first and second corners of one of said device cases, and a second rotation shaft provided between said first and second corners of another of said device cases; and
wherein each of said pair of cover members comprises a set of two notches that surround first and second rotation shafts of said hinge mechanism, the set of two notches being provided to each area adjacent to an area in which said fixing means of said pair of cover members are provided.

6. The foldable device according to claim 1, wherein each of said pair of device cases comprises plate-shaped bodies having a prescribed thickness, and a control board or the like inside the device cases;
wherein said hinge mechanism has first and second rotation shafts which are disposed in parallel with each other;
wherein each of said first and second rotation shafts is disposed adjacent to a side wall of each end side of said pair of device cases that are connected by said hinge mechanism;
wherein said first and second rotation shafts are linked together so that each of said pair of device cases is rotatable about the first rotation shaft or the second rotation shaft in an opposite direction; and
wherein said hinge cover has substantially the same thickness or slightly less thickness than said pair of device cases in a state of covering said hinge mechanism.

7. The foldable device according to claim 1, wherein said hinge mechanism comprises a metal rigid body.

8. The foldable device according to claim 1, wherein said pair of device cases and said hinge cover are formed from a resin material.

9. The foldable device according to claim 1, wherein said hinge mechanism comprises:
a first frame comprising:
a joining piece having a plate shape and a prescribed length between a first end part and a second end part thereof, said joining piece being attached to one of said device cases, and
first and second arm pieces that stand in the same direction from each of the first and second end parts of said joining piece and that have joining parts formed at distal end parts of the first and second arm pieces;
a second frame comprising:
a joining piece having a plate shape and a prescribed length between a first end part and a second end part thereof, said joining piece being attached to another of said device cases, and
third and fourth arm pieces that stand in the same direction from each of the first and second end parts of said joining piece and that have joining parts formed at distal end parts of the third and fourth arm pieces; and
a third frame comprising:
a joining piece having a plate shape and a prescribed length between a first end part and a second end part thereof, and
first and second connecting pieces that stand in one direction from each of the first and second end parts of said joining piece, each of said first and second connecting pieces being branched to form first through fourth joining parts;
wherein said first through fourth joining parts are rotatably connected to said first through fourth arm pieces at said branched distal end parts thereby providing first through fourth connecting parts about which said first and second frames are rotatable with respect to said third frame
wherein a drive mechanism for rotating/retaining said first and second frames in a prescribed position is provided to at least one of said first through fourth connecting parts; and
wherein a connection is formed by a linking mechanism between at least one combination of connecting parts of said first or second connecting part and said third or fourth connecting part, and when said first frame is rotated a prescribed angle in one direction in relation to said third frame about said first and second connecting parts as an axis, said linking mechanism links the rotation so that said second frame rotates the same angle as said first frame in the opposite direction with respect to said third frame about said third and fourth connecting parts as an axis.

10. The foldable device according to claim 9, wherein fixing means for fixing at least one of said pair of cover members is provided to a joining piece of said third frame.

11. The foldable device according to claim 9, wherein said drive mechanism is a cam mechanism comprising a pair of cam ends and a spring body for pushing said cam ends;
wherein said linking mechanism is a gear mechanism comprising gears fixed to each of said first or second arm piece and said third or fourth arm piece, and an even number of free gears attached between said gears.

12. The foldable device according to claim 9, wherein said drive mechanism is a cam mechanism comprising a pair of cam ends and a spring body for pushing said cam ends;
wherein said linking mechanism is a link mechanism comprising an actuation bar in which a center part of the actuation bar is fixed so as to be able to rotate between said first or second connecting part and said third or fourth connecting part, and a pair of cam bridge ends fixed to a rotation shaft of said first or second arm piece and said third or fourth arm piece that fix one end part and the other end part of said actuation bar in a position separated a prescribed distance from said rotation shaft.

13. The foldable device according to claim 6, wherein said hinge mechanism further comprises:
a connecting member via which said first and second rotation shafts are disposed parallel and linked together; and
a pair of stopper members each provided between the connecting member and each of said pair of device cases in a manner that limits a rotation angle of said pair of device cases about the first and second rotation shafts,
wherein said pair of stopper members are symmetrically provided with respect to the connecting member to allow said pair of device cases to be rotated at the same angle as each other in an opposite direction.

* * * * *